(12) United States Patent
Kuroda

(10) Patent No.: US 10,415,633 B2
(45) Date of Patent: Sep. 17, 2019

(54) STABILIZER LINK

(71) Applicant: NHK Spring Co., Ltd., Kanagawa (JP)

(72) Inventor: Shigeru Kuroda, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 196 days.

(21) Appl. No.: 15/551,795

(22) PCT Filed: Feb. 2, 2016

(86) PCT No.: PCT/JP2016/053027
§ 371 (c)(1),
(2) Date: Aug. 17, 2017

(87) PCT Pub. No.: WO2016/132885
PCT Pub. Date: Aug. 25, 2016

(65) Prior Publication Data
US 2018/0252258 A1 Sep. 6, 2018

(30) Foreign Application Priority Data
Feb. 17, 2015 (JP) .................. 2015-028402

(51) Int. Cl.
*F16C 11/06* (2006.01)
*B60G 21/055* (2006.01)

(52) U.S. Cl.
CPC ........ *F16C 11/0638* (2013.01); *B60G 21/055* (2013.01); *B60G 21/0551* (2013.01);
(Continued)

(58) Field of Classification Search
CPC ..... Y10T 403/32721; Y10T 403/32737; F16C 11/0633; F16C 11/0638
See application file for complete search history.

(56) References Cited

U.S. PATENT DOCUMENTS 3,953,139 A    4/1976  Uchida
4,386,869 A    6/1983  Smith
(Continued)

FOREIGN PATENT DOCUMENTS

CA    2289155    *  5/2000    ........... B60G 21/055
CN    102753847 A    10/2012
(Continued)

OTHER PUBLICATIONS

Office Action (Japanese only), Japanese Patent Application No. 2015-028402, dated Jan. 19, 2016.
(Continued)

*Primary Examiner* — Michael P Ferguson
(74) *Attorney, Agent, or Firm* — Marshall, Gerstein & Borun LLP

(57) ABSTRACT

A stabilizer link of the present invention includes connecting parts that has a housing which supports a ball stud to be connected to the first or second structure so as to be swingable and rotatable, wherein the ball stud has a stud part extending from a spherical part and the housing houses a support member to support a spherical part of the ball stud in a spherical space so as to be slidable, wherein the support member includes: an opening where the spherical space is open for the stud part; a lubricant receiving part in a concave shape that faces the opening; and a wall surface that forms the spherical space for the spherical part to slide thereon and has recessed grooves formed on both sides or one side of a portion of the wall surface having the maximum inner radius about the central axis of the spherical space.

7 Claims, 22 Drawing Sheets

(52) U.S. Cl.
CPC ...... *F16C 11/0647* (2013.01); *F16C 11/0657* (2013.01); *B60G 2204/1224* (2013.01); *B60G 2204/416* (2013.01); *F16C 2208/60* (2013.01); *F16C 2208/66* (2013.01); *F16C 2220/04* (2013.01); *F16C 2326/05* (2013.01)

(56) References Cited

U.S. PATENT DOCUMENTS

| | | | | |
|---|---|---|---|---|
| 5,395,176 | A | * | 3/1995 | Zivkovic .......... F16C 11/0638 403/122 |
| 7,040,833 | B2 | * | 5/2006 | Kondoh .......... F16C 11/0638 403/135 |
| 8,550,741 | B2 | * | 10/2013 | Kuroda .......... F16C 11/0685 403/132 |
| 2003/0081989 | A1 | | 5/2003 | Kondoh |
| 2012/0301213 | A1 | | 11/2012 | Kuroda et al. |

FOREIGN PATENT DOCUMENTS

| | | | | |
|---|---|---|---|---|
| CN | 202768622 U | | 3/2013 | |
| EP | 1 489 314 | * | 6/2004 | .......... F16C 11/06 |
| JP | S5127745 U | | 2/1976 | |
| JP | S5824614 A | | 2/1983 | |
| JP | H0118886 Y2 | | 6/1989 | |
| JP | H068337 Y2 | | 3/1994 | |
| JP | 4097118 B2 | | 6/2008 | |
| JP | 2011-169353 A | | 9/2011 | |
| JP | 2011/247338 A | | 12/2011 | |
| JP | 2012-077841 A | | 4/2012 | |
| JP | 2012-189146 A | | 10/2012 | |
| JP | 2015152153 A | | 8/2015 | |
| WO | WO 2010/029847 | * | 3/2010 | .......... F16C 11/06 |

OTHER PUBLICATIONS

International Search Report (English translation), International Application No. PCT/JP2016/053027, dated May 17, 2016.
The First Chinese Office Action for Application No. 201680010453.X, dated Mar. 19, 2019.
European Search Report for Application No. 16752272.1, dated Sep. 28, 2018.

* cited by examiner

CORRELATION BETWEEN INTERFERENCE AND TORQUE

CORRELATION BETWEEN INTERFERENCE AND ELASTIC LIFT

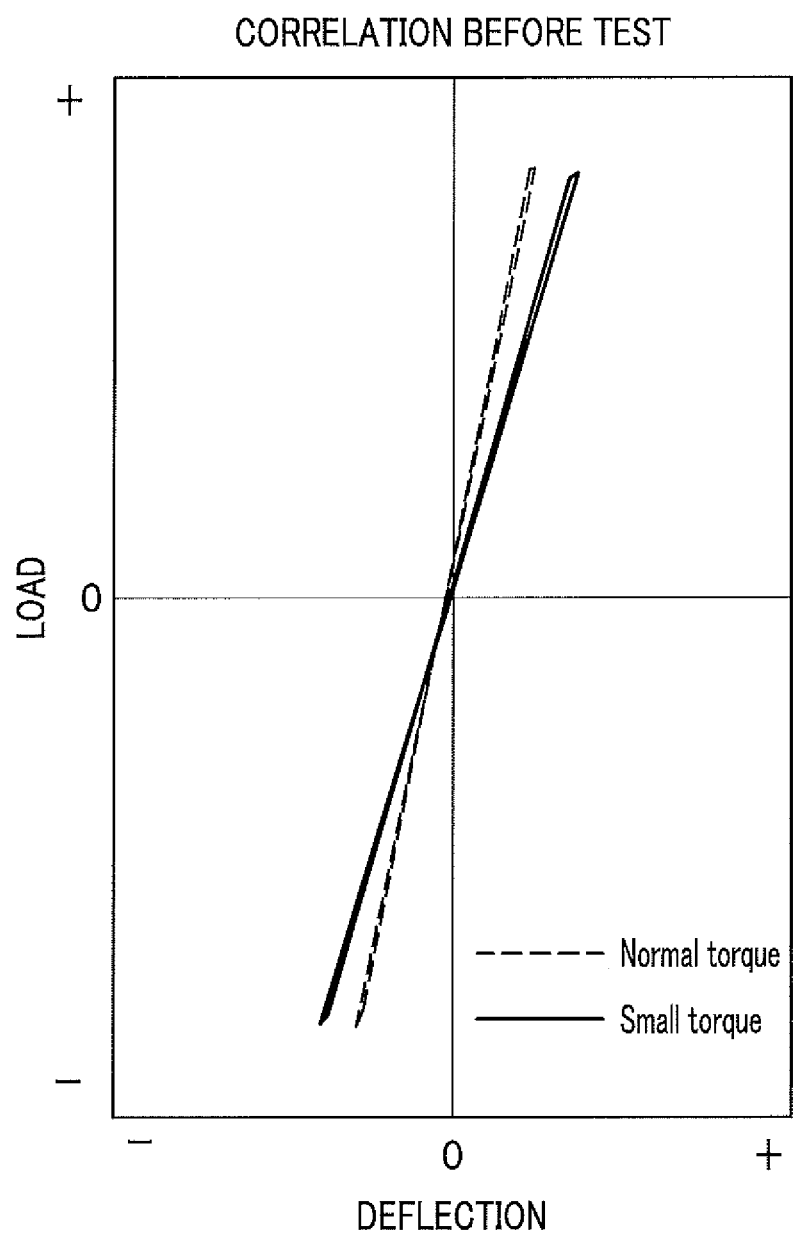

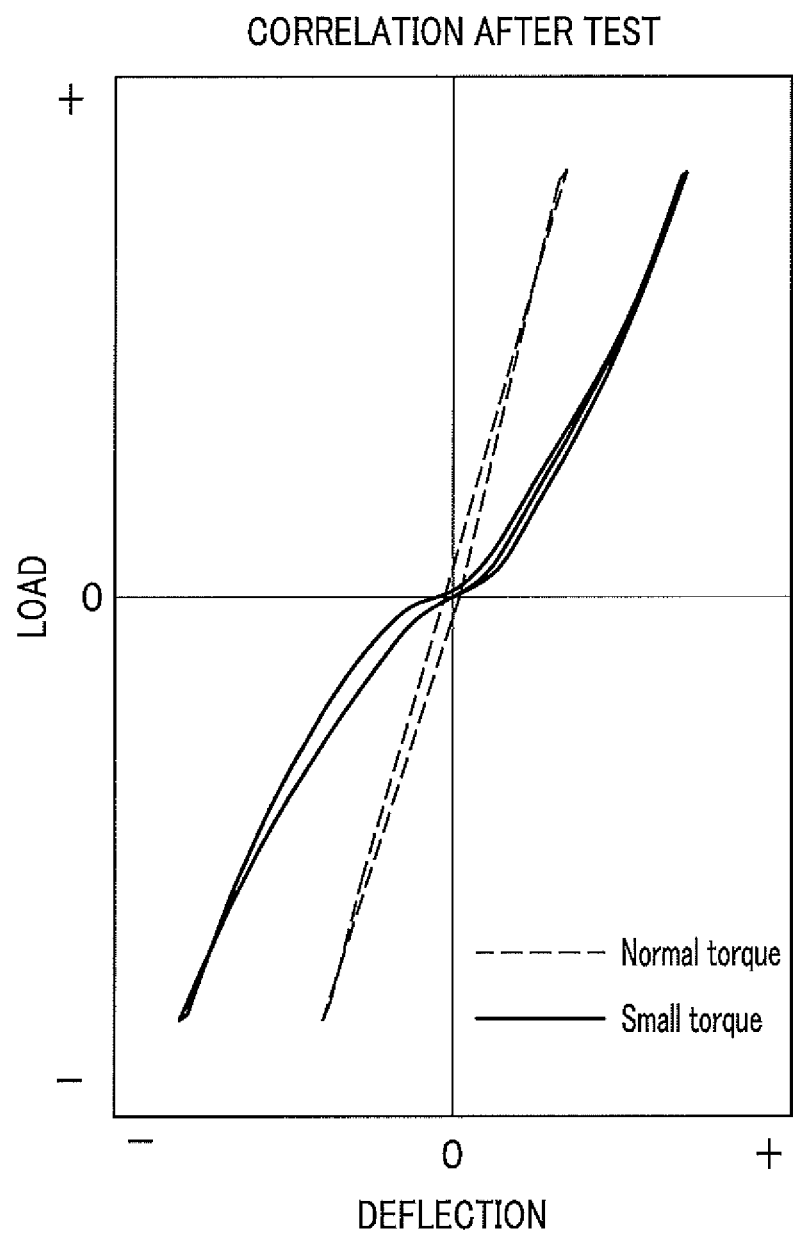

STABILIZER LINK

CROSS-REFERENCE TO RELATED APPLICATIONS

This application is a U.S. National Stage Application under 35 U.S.C. § 371 of International Patent Application No. PCT/JP2016/053027 filed Feb. 2, 2016, which claims the benefit of priority to Japanese Patent Application No. 2015-028402 filed Feb. 17, 2015, the disclosures of all of which are hereby incorporated by reference in their entireties.

TECHNICAL FIELD

The present invention relates to a stabilizer link to be connected with a suspension of a vehicle.

BACKGROUND ART

A vehicle conventionally includes a suspension and a stabilizer, as disclosed in Japanese Patent Application Publication No. 2011-247338. The suspension includes an oil damper and a compression coil spring to reduce the impact transmitted from the road surface to the vehicle body.

The stabilizer uses a restoring force caused by torsional deformation of a bar to increase roll stiffness (rigidity against torsion) of the vehicle body. The suspension and the stabilizer are connected with each other via a stabilizer link. The stabilizer link is formed to have one connecting part to be fixed to the suspension and the other connecting part to be fixed to the stabilizer, which are arranged at both ends of a solid or hollow support bar.

Each of the connecting parts arranged at both ends of the support bar has a ball joint structure to include a ball stud and a housing for accommodating the ball stud. The housings of the connecting parts are integrally attached to both ends of the support bar. The housing is a member in a cup shape to accommodate a sphere part (ball part) of the ball stud so as to be slidable. The housing includes therein a resin supporting member (ball seat). The ball part of the ball stud is received by the ball seat so as to be slidable.

The ball part is slidable on the inner surface of the ball seat to allow the ball stud to be swingable and rotatable. The stabilizer link has a ball joint structure as described above in each of the connecting parts at both ends, to movably connect the suspension with the stabilizer.

For the ball stud smoothly swinging and rotating, the frictional force between the ball part and the ball seat is preferably maintained at a low value as designed. Here, the ball seat receiving the ball part is made of resin. Accordingly, the size largely varies at the time of molding to make it difficult for the frictional force between the ball part and the ball seat to be maintained.

SUMMARY OF THE INVENTION

Problems to be Solved

Characteristics of movement between the suspension and the stabilizer affect steering stability of a vehicle, smoothness of the steering, ride quality, and the like. For example, if the torque of the ball stud swinging and rotating is large, the suspension and the stabilizer stiffly operate with each other to have problems such as lack of smoothness in operation and degradation of ride quality. Also, if the interference between the ball part and the ball seat is small, the ball part and the ball seat have reduced friction accordingly but suffer from loosening (elastic lift) therebetween. Such loosening causes noise and instability of ride quality, and therefore deteriorates the vehicle quality.

The stabilizer link is a part having a ball joint structure that connects the stabilizer with a strut, an arm, and the like. As the suspension of the vehicle strokes, the stabilizer link is swung and rotated, and these characteristics are defined as swinging torque and rotating torque.

Reducing suspension friction has been increasingly required for the purpose of improving ride quality of vehicle. Accordingly, the stabilizer link as a suspension part is required to have its swinging and rotating torque reduced. Decreasing the interference between the ball seat and the housing leads to reducing the torque but at the same time causes the elastic lift to be increased.

The ball seat is a resin part and is manufactured by injection molding. The wall of the ball seat is formed to be thicker downward and thinner upward in the axial direction of the ball stud, and then the ball seat is not formed to have a constant outer radius due to the influence of heat shrinkage during molding, to have a tapered shape of being narrower downward and being wider upward. That is, a flange portion is formed in such a shape that the opening side of the main body extends peripherally outward. In contrast, the housing into which the ball seat is fitted is formed to have the inner radius being vertically straight in the axial direction of the ball stud, and therefore the ball seat and the housing contact less with each other as the interference therebetween is decreased, to have elastic lift increased.

As a result, the ball joint part (connection part) may suffer from loosening to have abnormal noise while the vehicle is traveling. This loosening deteriorates accurate dynamic characteristics of the stabilizer link system. Besides, the elastic lift accelerates wearing of mutual parts to further increase the occurrence of abnormal noise and inaccurate dynamic characteristics of the stabilizer link system. As the elastic lift increases inversely with torque reduction, there is a limit to the torque reduction of the ball stud.

The present invention has been devised in view of the above circumstances, and is intended to provide a stabilizer link that effectively suppresses loosening between a spherical part of a ball stud and a support member, which is arranged in a housing to receive the spherical portion so as to be slidable, and allows torque of the ball stud swinging and rotating to be reduced.

Solution to Problems

In order to solve the above-mentioned problems, a stabilizer link according to a first aspect of the present invention includes: an arm part; and connecting parts that are arranged at both ends of the arm part, wherein one of the connecting parts is connected to a first structure and the other of the connecting parts is connected to a second structure, and at least one of the connecting parts has a ball joint structure, wherein the connecting part having the ball joint structure includes: a housing that supports a ball stud to be connected to the first or second structure so as to be swingable and rotatable, the ball stud having a spherical part and a stud part extending from the spherical part; and a support member that receives the spherical part in a spherical space so as to be slidable for the housing to support the ball stud, and includes: an opening where the spherical space is open for the stud part extending therethrough; a lubricant receiving part in a concave shape that is formed at a bottom opposed to the opening; and a wall surface that forms the spherical space for the spherical part to slide thereon and has recessed grooves formed circumferentially about the central axis of the spherical space running from the opening to the lubricant receiving part, on both sides or one side in the central axis direction of a portion of the wall surface having the maximum inner radius about the central axis.

According to the first aspect of the present invention, the wall surface of the support member forms the spherical space for the spherical part to slide thereon and has the recessed grooves formed circumferentially about the central axis of the spherical space running from the opening to the lubricant receiving part, on both sides or one side in the central axis direction of the portion of the wall surface having the maximum inner radius about the central axis, to allow the ball stud to be well supported yet to have reduced torque.

A second aspect of the present invention is the stabilizer link according to the first aspect of the present invention, wherein the recessed grooves are formed in zones of the wall surface where the torque required for sliding the spherical part in the spherical space is larger than that in the other zones except an end of the wall surface.

According to the second aspect of the present invention, the recessed grooves are formed in zones of the wall surface where the torque required for sliding the spherical part in the spherical space is larger than that in the other zones except the end of the wall surface, to allow the ball stud to have reduced torque even if a recessed groove is formed in a narrow zone. As the torque is effectively reduced, the recessed groove may occupy a relatively narrow zone for reliably supporting the ball stud.

A third aspect of the present invention is the stabilizer link according to the first or second aspect of the present invention, wherein the size of the recessed groove is determined so that the torque required for sliding the spherical part in the spherical space is 0.5 Nm or less.

According to the third aspect of the present invention, the size of the recessed groove is determined so that the torque required for sliding the spherical part in the spherical space is 0.5 Nm or less, to allow the ball stud to have reduced torque as desired.

A stabilizer link according to a fourth aspect of the present invention includes: an arm part; and connecting parts that are arranged at both ends of the arm part, wherein one of the connecting parts is connected to a first structure and the other of the connecting parts is connected to a second structure, and at least one of the connecting parts has a ball joint structure, wherein the connecting part having the ball joint structure includes: a housing that supports a ball stud to be connected to the first or second structure so as to be swingable and rotatable, wherein the ball stud has a spherical part and a stud part extending from the spherical part; and a support member that receives the spherical part in a spherical space so as to be slidable for the housing to support the ball stud, and includes: an opening where the spherical space is open for the stud part extending therethrough; a lubricant receiving part in a concave shape that is formed at a bottom opposed to the opening; and a wall surface that forms the spherical space for the spherical part to slide thereon and has a recessed groove formed circumferentially about the central axis of the spherical space running from the opening to the lubricant receiving part, in the vicinity of a portion of the wall surface having the maximum inner radius about the central axis, wherein the size of the recessed groove is determined so that the torque required for sliding the spherical part in the spherical space is 0.5 Nm or less.

According to the fourth aspect of the invention, the wall surface of the support member forms the spherical space for the spherical part to slide thereon and has the recessed groove formed circumferentially about the central axis of the spherical space running from the opening to the lubricant receiving part, in the vicinity of the portion of the wall surface having the maximum inner radius about the central axis, wherein the size of the recessed groove is determined so that the torque required for sliding the spherical part in the spherical space is 0.5 Nm or less, to allow the ball stud to have the swinging torque and the rotating torque reduced as desired.

A fifth aspect of the present invention is the stabilizer link according to any one of the first, second, and fourth aspects of the present invention, wherein a zone of the wall surface forming the spherical space, on which the spherical part slides, occupies 38.5% or more of a zone of the same defined by top and bottom circumferences of the spherical space in correspondence with a central angle of 63 to 75 degrees.

According to the fifth aspect of the present invention, the zone of the wall surface forming the spherical space, on which the spherical part slides, occupies 38.5% or more of the zone of the same defined by top and bottom circumferences of the spherical space in correspondence with a central angle of 63 to 75 degrees, to allow the ball stud to be reliably supported.

A sixth aspect of the present invention is the stabilizer link according to any one of the first, second, and fourth aspects of the present invention, wherein the distance between an edge of the spherical space, on which the spherical part slides, and the outmost recessed groove is 0.5 mm or more.

According to the sixth aspect of the present invention, the support member reliably supports the spherical part of the ball stud. In addition, at the time of the die being removed from the spherical space of the support member, the support member forming the spherical space is inhibited from chipping.

A seventh aspect of the present invention is the stabilizer link according to any one of the first, second, and fourth aspects of the present invention, wherein an end of the recessed groove continues to the wall surface in the spherical space at an angle of 50 degrees or more to a normal line to the wall surface.

According to the seventh aspect of the present invention, the end of the recessed groove continues to the wall surface in the spherical space at an angle of 50 degrees or more to a normal line to the wall surface, to falicitate removing the die at the time of forming the support member.

An eighth aspect of the present invention is the stabilizer link according to any one of the first, second, and fourth aspects of the present invention, wherein the depth of the recessed groove is 0.08 mm to 0.25 mm.

According to the eighth aspect of the present invention, the depth of the recessed groove is 0.08 mm to 0.25 mm, to avoid the recessed groove from impairing its function when the support member is deformed. In addition, the strength of the support member is ensured.

A ninth aspect of the present invention is the stabilizer link according to any one of the first, second, and fourth aspects of the present invention, wherein an upper end of the spherical part in a direction of the axis of the stud part is exposed on the outside of the spherical space.

According to the ninth aspect of the present invention, the upper end of the spherical part in the direction of the axis of the stud part is exposed on the outside of the spherical space, to allow the ball stud to be smoothly operated.

A tenth aspect of the present invention is the stabilizer link according to any one of the first, second, and fourth aspects of the present invention, wherein the support member is made of a thermoplastic resin and is injection molded to form the recessed groove.

According to the tenth aspect of the present invention, the support member is made of a thermoplastic resin and is injection molded to form the recessed groove, to facilitate forming the recessed groove.

Advantageous Effects of the Invention

The present invention provides a stabilizer link that effectively suppresses loosening between the spherical part of the ball stud and the support member, which is accommodated in the housing to receive the spherical part so as to be slidable, to cause the torque of the ball stud swinging and rotating to be reduced.

BRIEF DESCRIPTION OF DRAWINGS

FIG. 8A is a chart showing the correlation, before a durability test, between the deflection of the outer surface of the ball seat and the load;

FIG. 8B is a chart showing the correlation, after a durability test, between the deflection of the outer surface of the ball seat and the load;

DETAILED DESCRIPTION

Hereinafter, embodiments of the present invention will be described in detail with reference to the drawings as appropriate.

Figure 1:
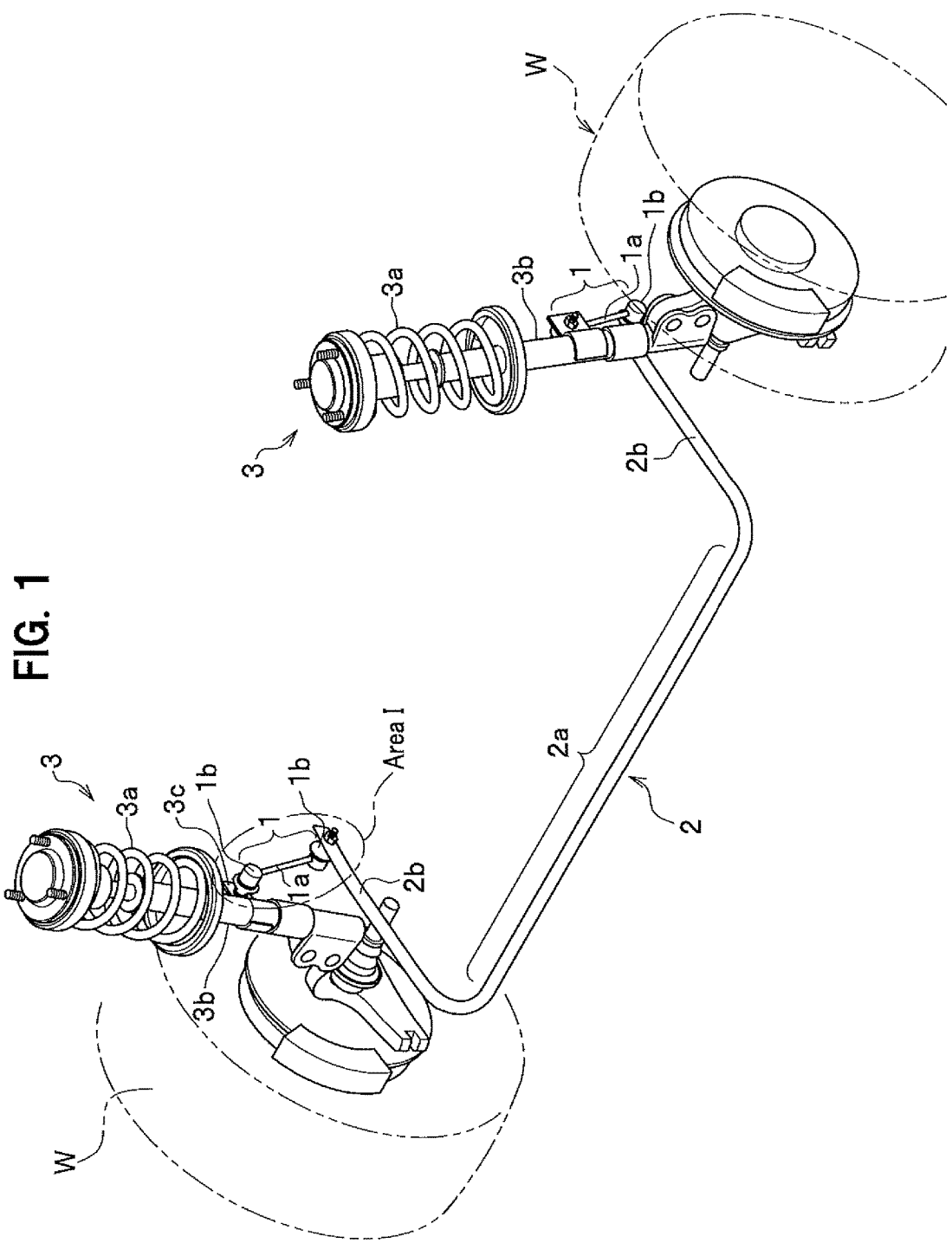
FIG. 1 is a perspective view of a stabilizer link connecting a suspension damper with a torsion bar.

FIG. 1 is a perspective view of a stabilizer link according to an embodiment of the present invention connecting a suspension damper with a stabilizer.

A wheel W used for a vehicle (not shown) travelling is attached to a vehicle body (not shown) via a suspension 3. The suspension 3 includes a coil spring 3a and a suspension damper 3b. The suspension damper 3b rotatably supports the wheel W. The suspension damper 3b and the coil spring 3a damp the impact applied to the vehicle body from the wheel W. The suspension damper 3b is attached to the vehicle body (not shown) via the coil spring 3a. The viscous damping force of the suspension damper 3b at the time of expansion and contraction and the elastic force of the coil spring 3a are used to damp vibration transmitted to the vehicle body by the suspension 3.

A stabilizer 2 is connected between the right and left suspensions 3. The stabilizer 2 increases the roll rigidity (rigidity against torsion) of the vehicle body to prevent the vehicle from rolling. The stabilizer 2 has a torsion bar 2a and a pair of arm parts 2b extending in a U-shape from both ends of the torsion bar 2a.

The stabilizer 2 is formed with a rod-shaped spring member which is appropriately bent according to the shape of the vehicle. The stabilizer 2 connects the two suspension dampers 3b, respectively supporting the two opposed wheels W, with each other via a stabilizer link 1 of the present embodiment.

One end of one arm part 2b of the stabilizer 2 continues to one end of the torsion bar 2a, while the other end of one arm part 2b is connected to one connection part 1b of the stabilizer link 1. The other connecting part 1b of the stabilizer link 1 is connected to the suspension damper 3b.

Likewise, one end of the other arm part 2b of the stabilizer 2 continues to the other end of the torsion bar 2a, while the other end of the other arm part 2b is connected to one connection part 1b of the stabilizer link 1. The other connecting part 1b of the stabilizer link 1 is connected to the suspension damper 3b.

The torsion bar 2a extends from one suspension damper 3b toward the other suspension damper 3b. The arm parts 2b are shifted, such as when the vehicle turns, via the stabilizer link 1 due to the difference in expansion and contraction amount between the two suspension dampers 3b to twist the torsion bar 2a. The torsion bar 2a suppresses the rolling of the vehicle by the torsional elastic force acting to restore the torsion.

Stabilizer Link 1

Figure 2:
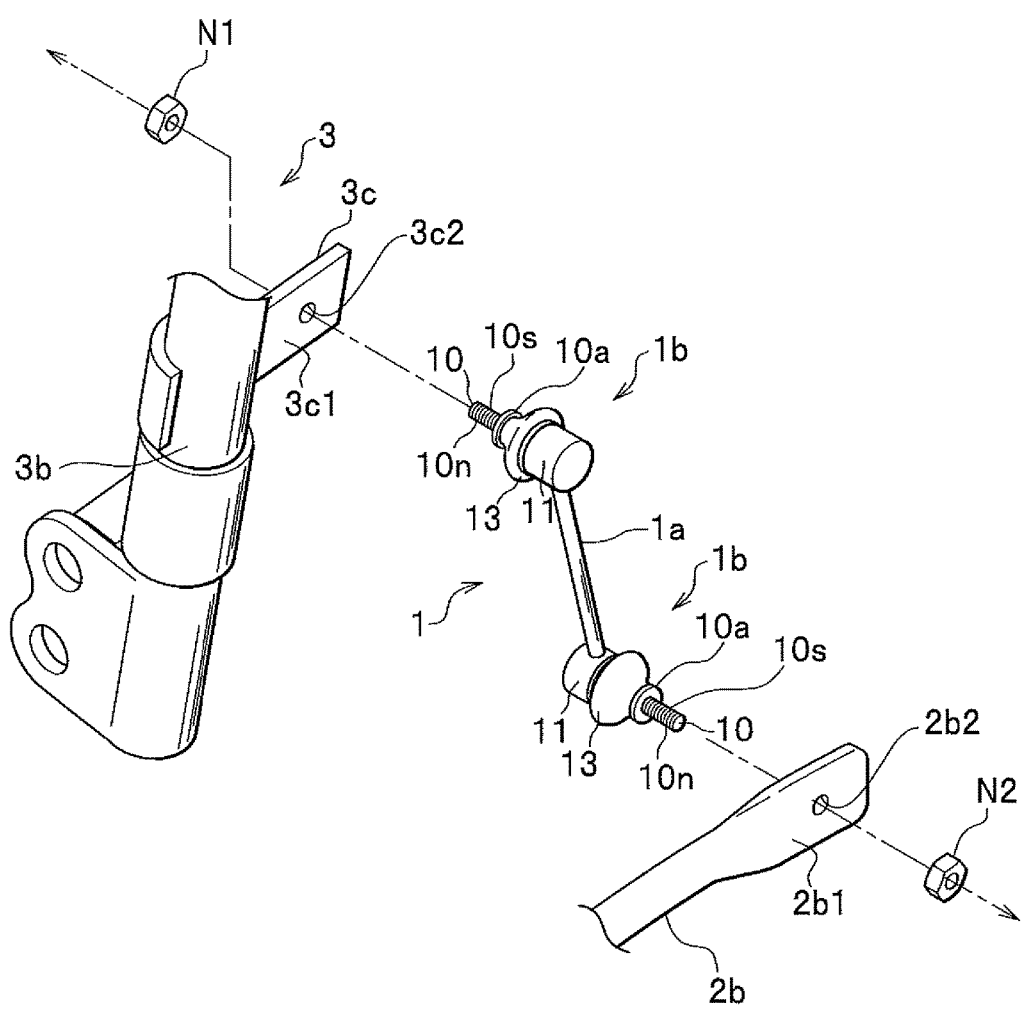
FIG. 2 is an exploded perspective view of disassembled area I in FIG. 1.

FIG. 2 is an exploded perspective view of disassembled area I in FIG. 1. The stabilizer link 1 is formed to include a rod-like support bar 1a and a connecting part 1b. Two connecting parts 1b are arranged at both ends of the support bar 1a. The support bar 1a is, for example, a rod-shaped member made of solid steel bar.

Figure 3:
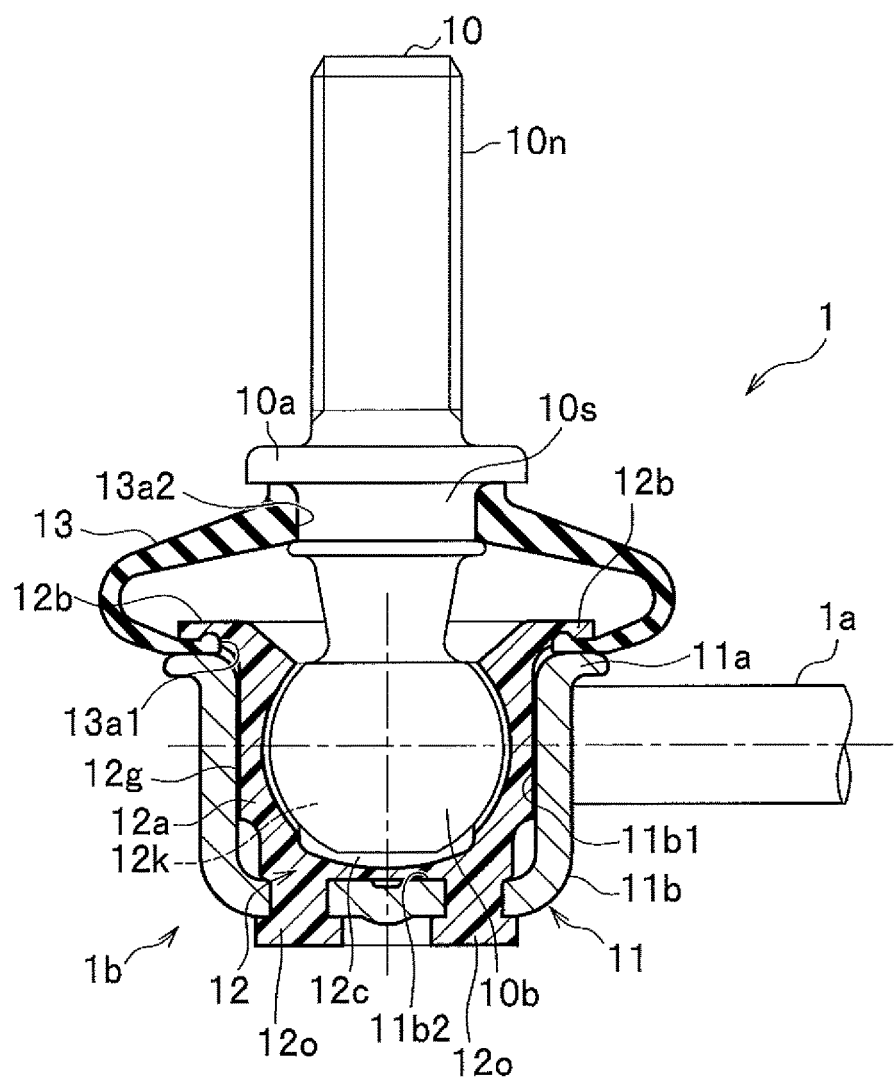
FIG. 3 is a longitudinal sectional view of a connecting part of the stabilizer link.

FIG. 3 is a longitudinal sectional view of a connecting part of the stabilizer link. In the connecting part 1b, a ball stud 10 is supported so as to be swingable and rotatable. The ball stud 10 is accommodated in a housing 11 of the connecting part 1b. The connecting part 1b includes a dust boot 13 for preventing foreign matter from entering into the housing 11.

Then, the ball stud 10 supported by one connecting part 1b is fastened and fixed to a bracket 3c of the suspension damper 3b (see FIG. 2). In addition, the ball stud 10 provided in the other connecting part 1b is fastened and fixed to the arm part 2b of the stabilizer 2.

The bracket 3c is attached to the suspension damper 3b by spot welding or the like. The bracket 3c has a flat part for fixing that extends so as to face the arm part 2b of the stabilizer 2 (on the center side of the vehicle not shown). A flat part 3c1 of the bracket 3c has a mounting hole 3c2 opened.

In addition, the ball stud 10 has a flange part 10a, which peripherally extends, formed on a stud part 10s. A male screw 10n is threaded on a distal end of the stud 10s beyond the flange part 10a.

Accordingly, one ball stud 10 has the stud part 10s inserted into the mounting hole 3c2 of the bracket 3c up to the flange part 10a which peripherally extends. Then, a nut N1 is screwed onto the male screw 10n threaded on the stud part 10s of the ball stud 10 which has been inserted through the mounting hole 3c2, to fix the ball stud 10 to the suspension damper 3b.

Further, the stabilizer link 1 has the arm part 2b plastically deformed into a flat shape in the vicinity of a distal end 2b1 so as to have an attachment hole 2b2 penetrated. For example, as shown in FIG. 2, the arm part 2b of the stabilizer link 1 has the distal end 2b1 and its vicinity plastically deformed into a flat face so as to face the suspension damper 3b, and has the attachment hole 2b2 opened in the distal end 2b1.

The other ball stud 10 has the stud part 10s inserted into the mounting hole 2b2 of the arm part 2b of the stabilizer 2 upto the flange part 10a. Then, a nut N2 is screwed onto the male screw 10n threaded on the stud part 10s of the ball stud 10 which has been inserted through the mounting hole 2b2, to fix the ball stud 10 to the arm part 2b of the stabilizer 2.

As described above, the stabilizer link 1 is fixed to the suspension damper 3b and the arm part 2b of the stabilizer 2 via the ball studs 10 arranged at both ends of the support bar 1a. The ball stud 10 is supported by the connecting part 1b of the stabilizer link 1 so as to be swingable and rotatable. Accordingly, the stabilizer link 1 is movable with respect to the suspension damper 3b and the torsion bar 2a. Thus, the stabilizer link 1 is a member to be connected to the stabilizer 2 and the suspension 3.

As described above, the stabilizer link 1 has the connecting parts 1b arranged at both ends of the support bar 1a. The connecting part 1b includes the housing 11 in a cup shape for accommodating a ball part 10b of the ball stud 10. The housing 11 is attached to each end of the support bar 1a by resistance welding or the like. The housing 11 is made of a steel material such as carbon steel for machine structural use and houses therein a ball seat 12 made of resin as a support member.

Ball Stud 10

As shown in FIG. 3, the ball stud 10 includes the ball part 10b in a substantially spherical shape and the stud part 10s unidirectionally extending from the ball part 10b. The ball stud 10 is received in the ball seat 12 of the connecting part 1b at the ball part 10b.

The ball part 10b of the ball stud 10 is formed in a true sphere or a shape close to a true sphere. The upper part of the ball part 10b continues to the stud part 10s, while the lower part of the ball part 10b is geometrically restricted in order to secure volume of a grease chamber 12c. The ball part 10b of the ball stud 10 is formed in a true sphere or a shape close to a true sphere within an allowance.

Ball Seat 12

Figure 4:
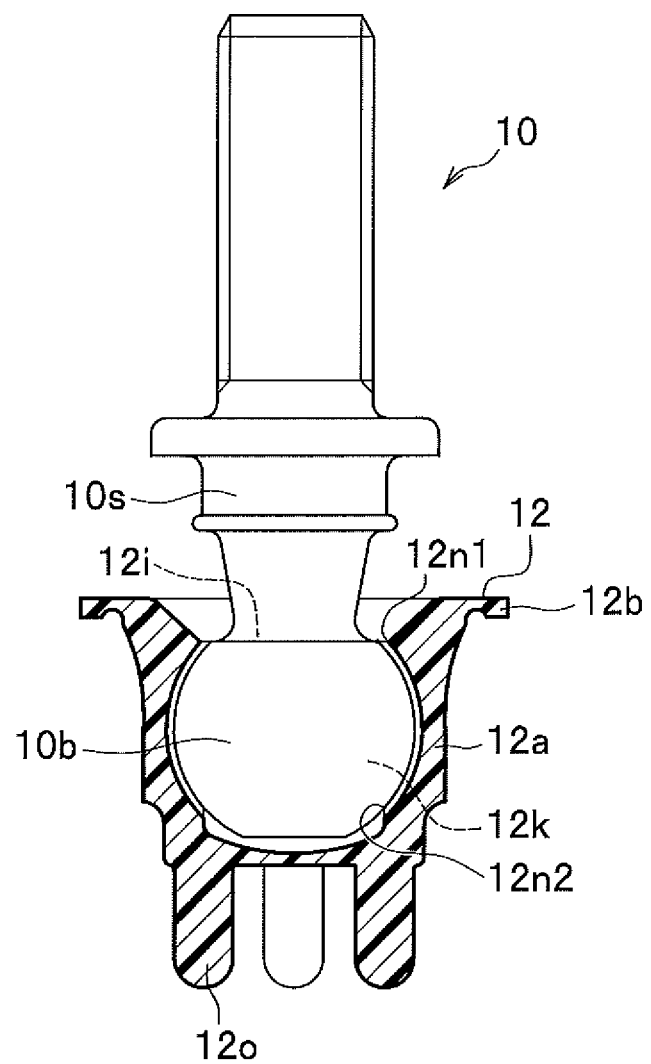
FIG. 4 is a longitudinal sectional view of a ball seat having a ball part of a ball stud fitted therein.

FIG. 4 is a longitudinal sectional view of the ball seat 12 having the ball part of the ball stud 10 fitted therein. The ball seat 12 is formed of resin by injection molding. The ball seat 12 is made of a thermoplastic resin such as POM (Polyacetal), PA6 (Polyamide 6), and PA66 (Polyamide 66).

The ball seat 12 is formed into a tapered shape in which the outer radius of a flange part 12b is larger than that of a main body 12a due to molding shrinkage. The ball seat 12 is made of resin and includes the main body 12a and the flange part 12b. The main body 12a is accommodated in the housing 11 (see FIG. 3). The main body 12a of the ball seat 12 has a cup shape in which the ball part 10b of the ball stud 10 is tightly fitted.

In addition, the main body 12a of the resin ball seat 12 is fixed into the housing 11 by hot pressure welding. That is, the main body 12a is formed with bosses 12o for fixing. The bosses 12o which have penetrated holes in the bottom of the housing 11 are melted to fix the ball seat 12 in the housing 11. The bosses 12o are pressed and welded in a heated state.

The main body 12a of the ball seat 12 encloses a spherical space 12k in a spherical shape. Then, the ball part 10b of the ball stud 10 is received in the spherical space 12k so as to be slidable. In addition, the stud part 10s of the ball stud 10, which is integrally formed with the ball part 10b, is moved together with the ball part 10b. At this time, the stud part 10s has sliding torque applied thereto due to the sliding in the spherical space 12k of the ball part 10b. Therefore, the ball stud 10 received in the ball seat 12 has the stud part 10s to be swingable and/or rotatable in accordance with the sliding of the ball part 10b. In other words, the housing 11 supports the ball stud 10 so as to be swingable and/or rotatable. In this manner, the connecting part 1b includes the ball stud 10 having the stud part 10s and the ball part 10b so as to be swingable and rotatable, to form a ball joint structure. At this time, swinging torque is applied to the stud part 10s when the stud part 10s swings, while rotating torque is applied to the stud part 10s when the stud part 10s rotates. That is, each of the swinging torque and the rotating torque is an aspect of the sliding torque.

The ball part 10b is arranged to have its upper end in the axial direction of the stud part 10s exposed on the outside of the spherical space. Note that the extending direction of the stud part 10s in the stabilizer link 1 is suitably determined according to the positional relationship between the suspension damper 3b (see FIG. 2) and the arm part 2b of the stabilizer 2.

As shown in FIG. 3, the housing 11 includes a flange part 11a and a main body 11b in a cup shape. The flange part 11a is formed so as to peripherally extend at an opening of the housing 11. In a state that the main body 12a of the ball seat 12 is housed in the main body 11b of the housing 11, the flange part 11a of the housing 11 and the flange part 12b of the ball seat 12 face each other. The end side of the dust boot 13 is held between the flange parts 11a, 12b which face each other.

Dust Boot 13

The dust boot 13 is a hollow member made of an elastic body such as rubber. The dust boot 13 prevents foreign matter (dirt or the like) from entering into the housing 11 or the ball seat 12.

The dust boot 13 is arranged around the ball stud 10 between the flange part 10a thereof and the flange part 11a of the housing 11. The dust boot 13 has two openings 13a1, 13a2 at positions facing each other. One opening 13a1 is formed to peripherally bend inward, and this portion is held between the flange parts 11a, 12b which face each other. The other opening 13a2 of the dust boot 13 is closely contacted with, and fixed to, the stud part 10s of the ball stud 10.

The dust boot 13 is shaped so as not to inhibit the stud part 10s from swinging and rotating. For example, the dust boot 13 preferably has a shape that largely bulges outward. Having a shape that largely bulges outward allows the dust boot 13 to cover the stud part 10s with a deformation allowance. As a result, the dust boot 13 is easily deformed in accordance with the stud part 10s swinging and/or rotating. This allows the ball stud 10 to smoothly swing and rotate without being inhibited by the dust boot 13.

Ball Seat 12 and Housing 11

Figure 5:
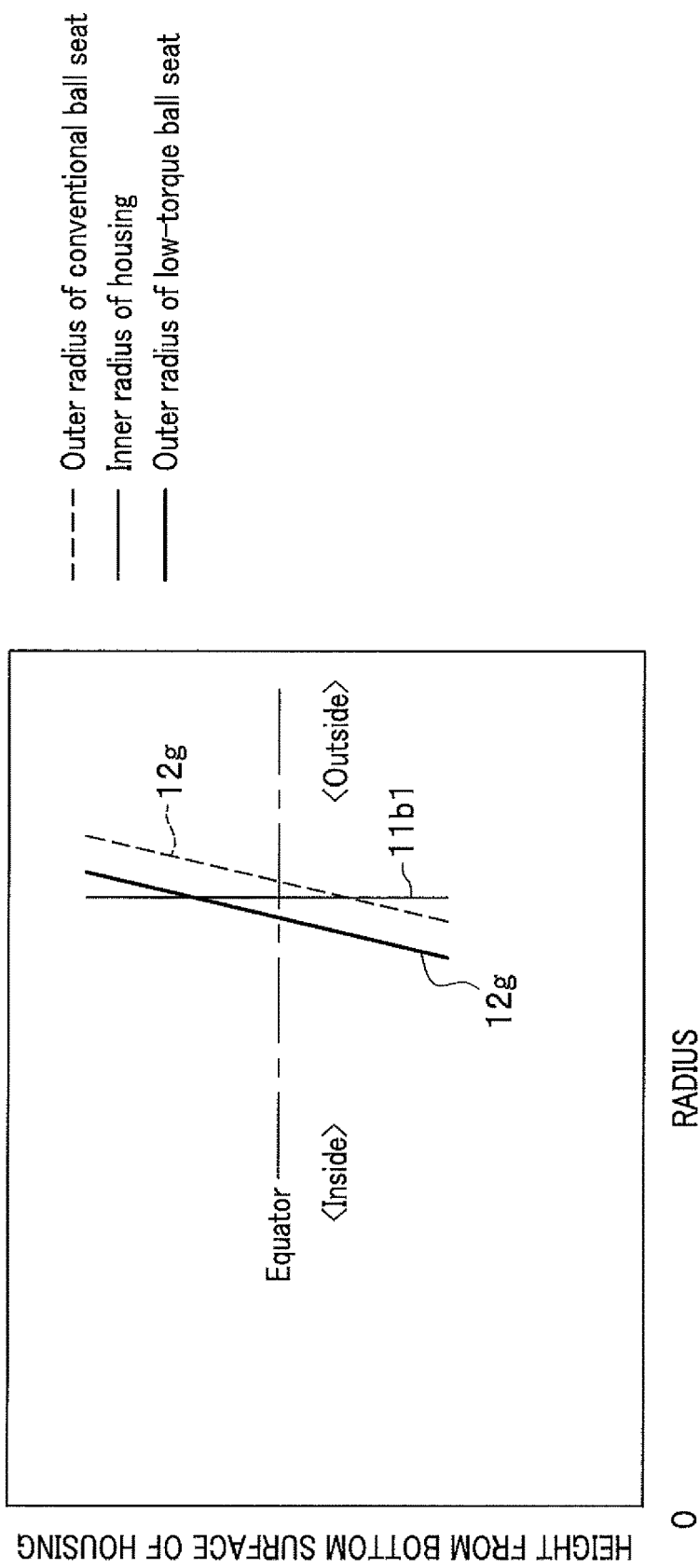
FIG. 5 is a chart showing the correlation between the radius of an inner surface of a main body of a housing and the outer radius of the ball seat.

FIG. 5 is a chart showing the correlation between the radius of an inner surface 11b1 (see FIG. 3) of the main body 11b of the housing 11 and the outer radius of the ball seat 12. The horizontal axis in FIG. 5 indicates the radius, and the vertical axis in FIG. 5 indicates the height from a bottom surface 11b2 of the housing 11. In FIG. 5, the solid line indicates the position of the inner surface 11b1 of the main body 11b of the housing 11, the broken line indicates the outer radius of a conventional ball seat having a large interference between the inner surface 11b1 of the main body 11b of the housing 11 and an outer surface 12g of the ball seat 12, and the bold solid line indicates the outer radius of the low-torque ball seat 12 having a small interference between the inner surface 11b1 of the main body 11b of the housing 11 and the outer surface 12g (see FIG. 3) of the ball seat 12.

If the inner surface 11b1 of the main body 11b of the housing 11 is vertically straight to have an identical radius (inner radius), the inner surface 11b1 of the housing 11 and the outer surface of the ball seat contact less with each other as the interference therebetween is reduced. In addition, if the interference between the inner surface 11b1 of the main body 11b of the housing 11 and the outer surface 12g of the ball seat 12 is increased (broken line in FIG. 5), the inner surface 11b1 of the housing 11 and the outer surface of the ball seat contact more with each other, that is, improved, but the rate of the ball seat 12 being pressed inward increases so that the torque at the time of the ball stud 10 swinging increases.

On the contrary, if the interference between the inner surface 11b1 of the main body 11b of the housing 11 and the outer surface 12g of the ball seat 12 is decreased (bold solid line in FIG. 5), the rate of the ball seat 12 being pressed inward decreases so that the torque at the time of the ball stud 10 swinging decreases. However, the elastic lift or the loosening between the inner surface 11b1 of the main body 11b of the housing 11 and the outer surface 12g of the ball seat 12 increases.

Interference Between Ball Seat 12 and Main Body of Housing

Figure 6:
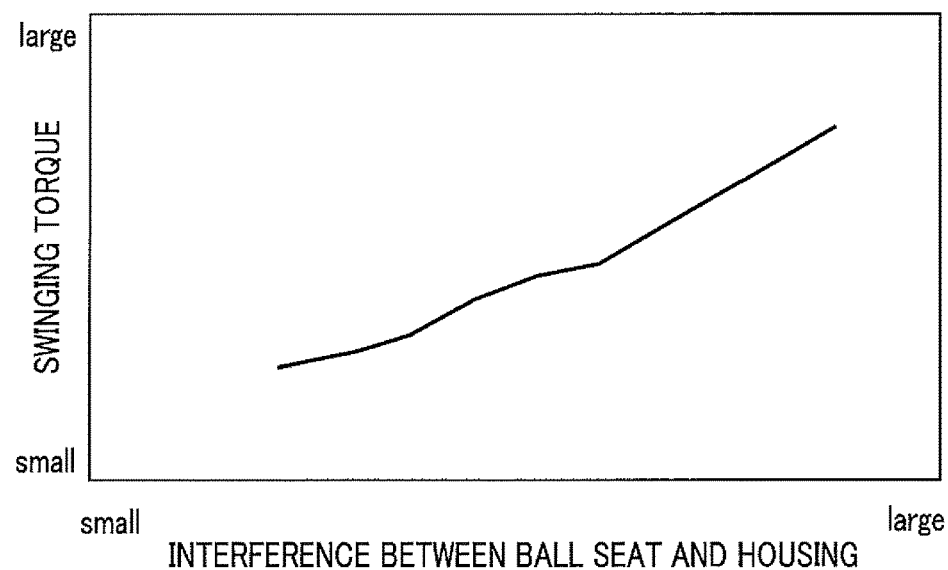
FIG. 6 is a chart showing the correlation between the interference between the outer surface of the ball seat and the inner surface of the main body of the housing, and the swinging torque of the ball stud.

FIG. 6 is a chart showing the correlation between the interference between the outer surface of the ball seat 12 and the inner surface of the main body of the housing, and the swinging torque of the ball stud. The horizontal axis indicates the interference between the outer surface 12g of the ball seat 12 and the inner surface 11b1 of the main body 11b of the housing 11, and the vertical axis indicates the swinging torque of the ball stud 10. The swinging torque of the ball stud 10 decreases as the interference between the outer surface 12g of the ball seat 12 and the inner surface 11b1 of the main body 11b of the housing 11 decreases.

This is because if the interference is large, the ball seat 12 is strongly pressed inward by the inner surface 11b1 of the housing 11 to have the pressing force increased at the time of an inner surface 12n of the ball seat 12 pushing the ball part 10b of the ball stud 10. On the contrary, if the interference is small, the ball seat 12 is not strongly pressed inward by the inner surface 11b1 of the housing 11 to have the pressing force decreased at the time of the inner surface 12n of the ball seat 12 pushing the ball part 10b of the ball stud 10.

Figure 7:
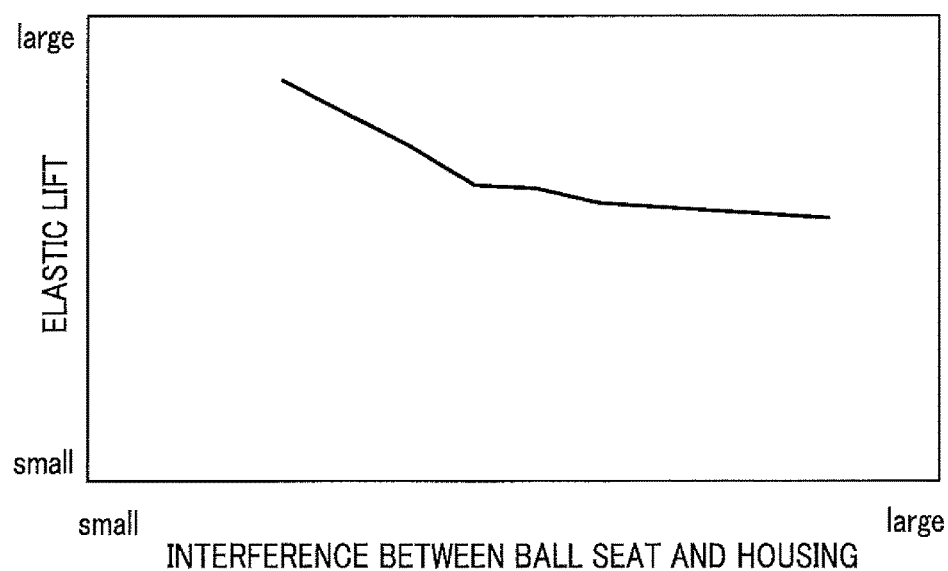
FIG. 7 is a chart showing the correlation between the interference between the outer surface of the ball seat and the inner surface of the main body of the housing, and the elastic lift.

FIG. 7 is a chart showing the correlation between the interference, between the outer surface of the ball seat and the inner surface of the main body of the housing, and the elastic lift. As the interference between the outer surface 12g of the ball seat 12 and the inner surface 11b1 of the main body 11b of the housing 11 decreases, the elastic lift, that is, the elastic lift (loosening) of the ball seat 12 with respect to the inner surface 11b1 of the main body 11b of the housing 11 increases.

This is because if the interference is large, the ball seat 12 is strongly pressed inward by the inner surface 11b1 of the housing 11 to have the elastic lift of the ball seat 12 decreased with respect to the inner surface 11b1 of the main body 11b of the housing 11. On the contrary, if the interference is small, the ball seat 12 is not strongly pressed inward by the inner surface 11b1 of the housing 11 to have the elastic lift of the ball seat 12 increased with respect to the inner surface 11b1 of the main body 11b of the housing 11.

FIGS. 8A and 8B are charts showing the presence or absence of an elastic lift before and after a durability test. FIG. 8A shows the correlation, before the durability test, between the deflection of the outer surface of the ball seat and the load, while FIG. 8B shows the correlation, after the durability test, between the deflection of the outer surface of the ball seat and the load. In FIGS. 8A and 8B, the horizontal axis indicates the deflection amount of the outer surface 12g of the ball seat 12, and the vertical axis indicates the load. The broken lines in FIGS. 8A and 8B indicate the cases where the interference between the inner surface 11b1 of the main body 11b of the housing 11 and the outer surface 12g of the ball seat 12 is normal, that is, the swinging and rotating torque of the ball stud 10 is normal. The solid lines in FIGS. 8A and 8B indicate the cases where the interference between the inner surface 11b1 of the main body 11b of the housing 11 and the outer surface 12g of the ball seat 12 is small, that is, the swinging and rotating torque of the ball stud 10 is small.

Before the durability test, as shown in FIG. 8A, the deflection is "0" when the load is set to "0" in both of the cases of the normal torque (broken line) and the small torque (solid line), to have no hysteresis observed. As described above, the interference is small in the case of the small torque, while the interference is large in the case of the normal torque. Accordingly, when a load is applied, the interference is small in the case of the small torque to have large amount of deflection, while the interference is large in the case of the normal torque to have small amount of deflection.

After the durability test, as shown in FIG. 8B, small hysteresis was observed in the case of the normal torque (broken line). In the case of the small torque (solid line), hysteresis larger than that in the case of the normal torque was observed. Besides, even when the load was set to "0," the deflection was not "0" to have loosening.

It has been found from FIG. 8B that if the torque is set to be small, the deflection amount of the outer surface 12g of the ball seat 12 increases to have an unfavorable characteristic of the deflection amount of the ball seat 12.

As it has been found from the results in FIGS. 6 to 8B, if the interference between the outer surface 12g of the ball seat 12 and the inner surface 11131 of the main body 11b of the housing 11 is large, the elastic lift is small but the swinging torque of the ball stud 10 is large. On the contrary, if the interference between the outer surface 12g of the ball seat 12 and the inner surface 11b1 of the main body 11b of the housing 11 is small, the elastic lift is large but the swinging torque of the ball stud 10 is small.

Figure 9:
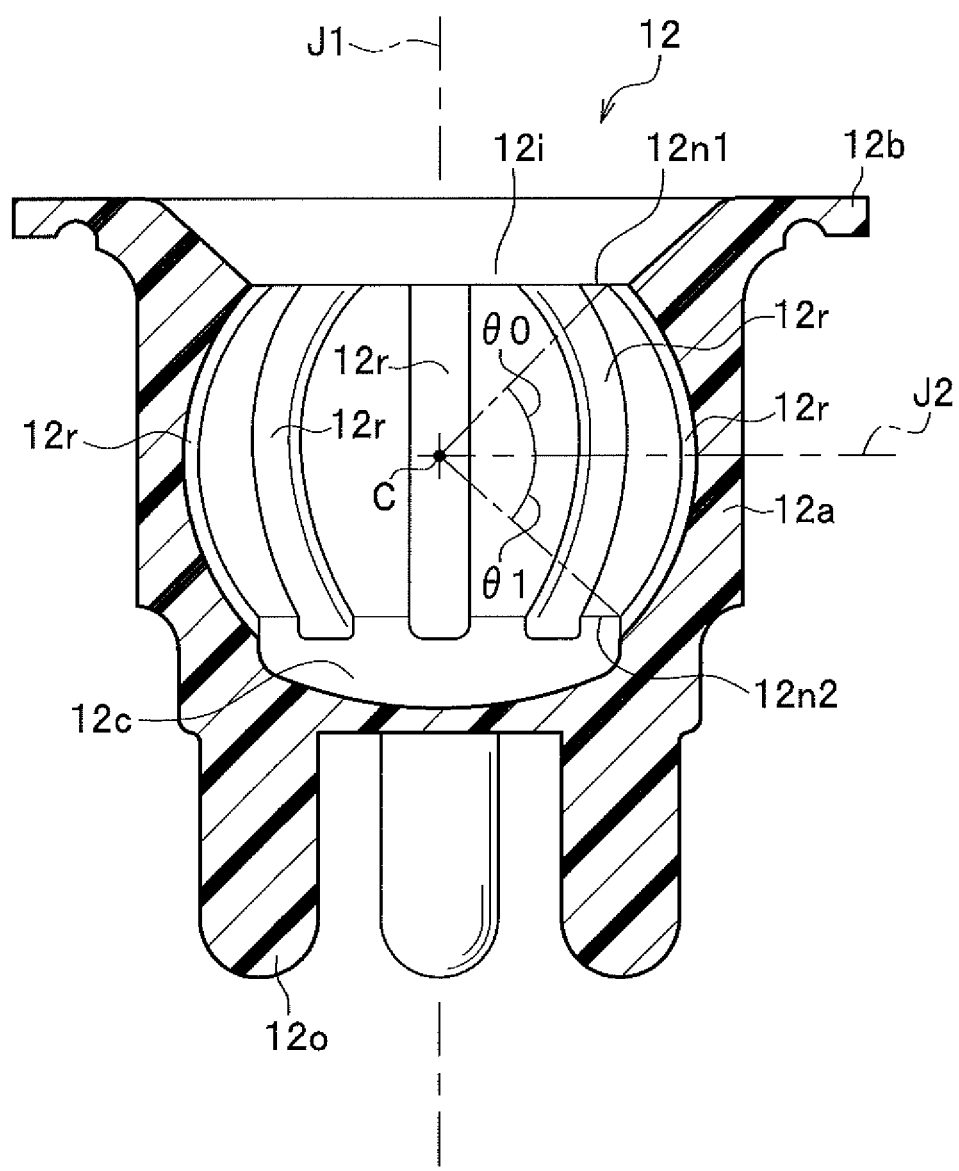
FIG. 9 is a longitudinal sectional view of a ball seat having grease grooves formed to show the internal structure thereof.

FIG. 9 is a longitudinal sectional view of the ball seat having the grease groove formed to show the internal structure thereof. The ball seat 12 has eight grease grooves 12r formed in the direction of the axis J1 of the ball seat 12 for retaining grease therein. For example, the grease groove 12r has a width of about 2 mm. The ball seat 12 has an opening 12i defined inside at the top thereof for the ball stud 10 swinging and rotating. For example, a ray extending from the central point of the ball seat 12 through the edge of the opening 12i is at an angle θ0 of about 23 to about 30 degrees to a center line J2 extending horizontally through the central point.

The ball seat 12 has the grease chamber 12c arranged inside at the bottom thereof. For example, a ray extending from the central point of the ball seat 12 through the edge of the grease chamber 12c is at an angle θ1 of about 40 to about 45 degrees to the ray J2.

Figure 10:
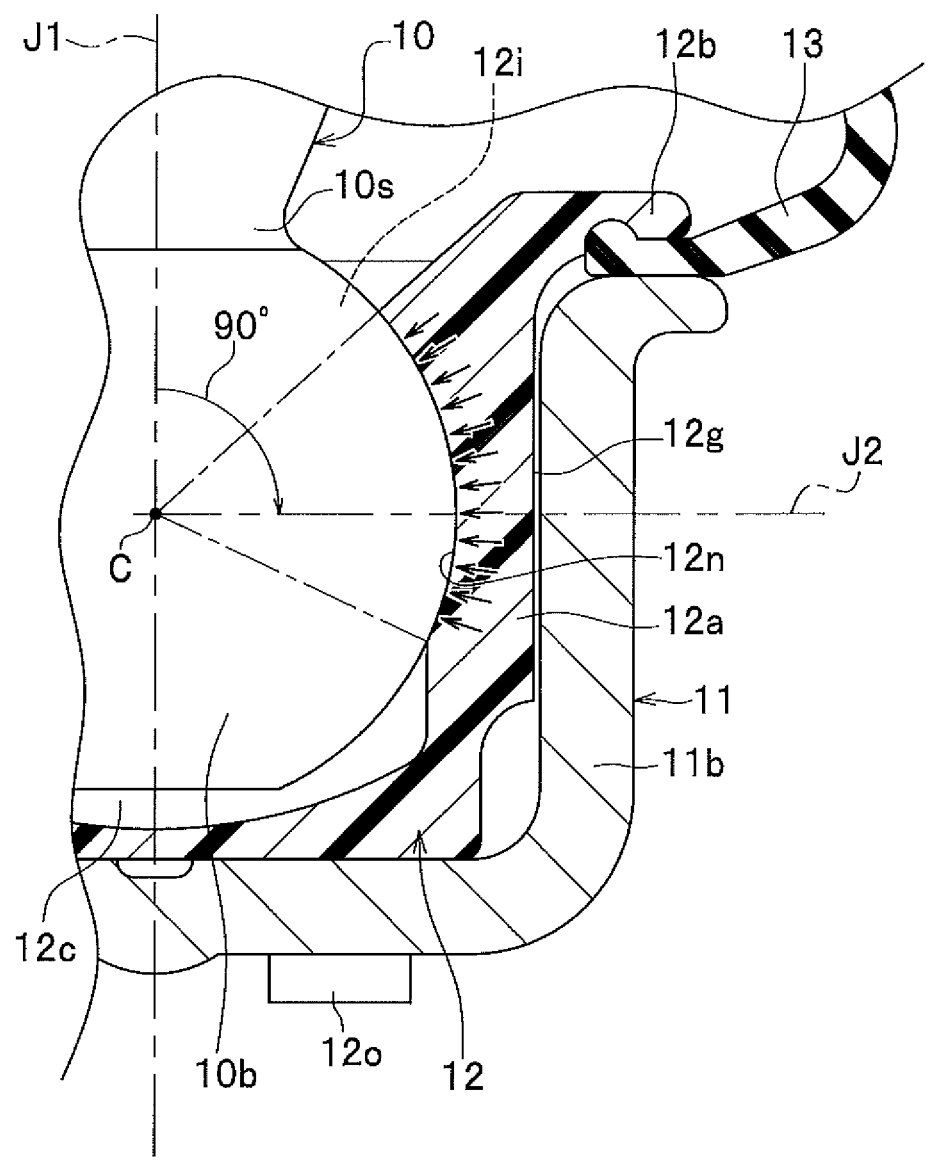
FIG. 10 is a cross-sectional view of the connecting part of the stabilizer link with the ball stud in an equilibrium state (setup state) to show the internal structure thereof.
Figure 11:
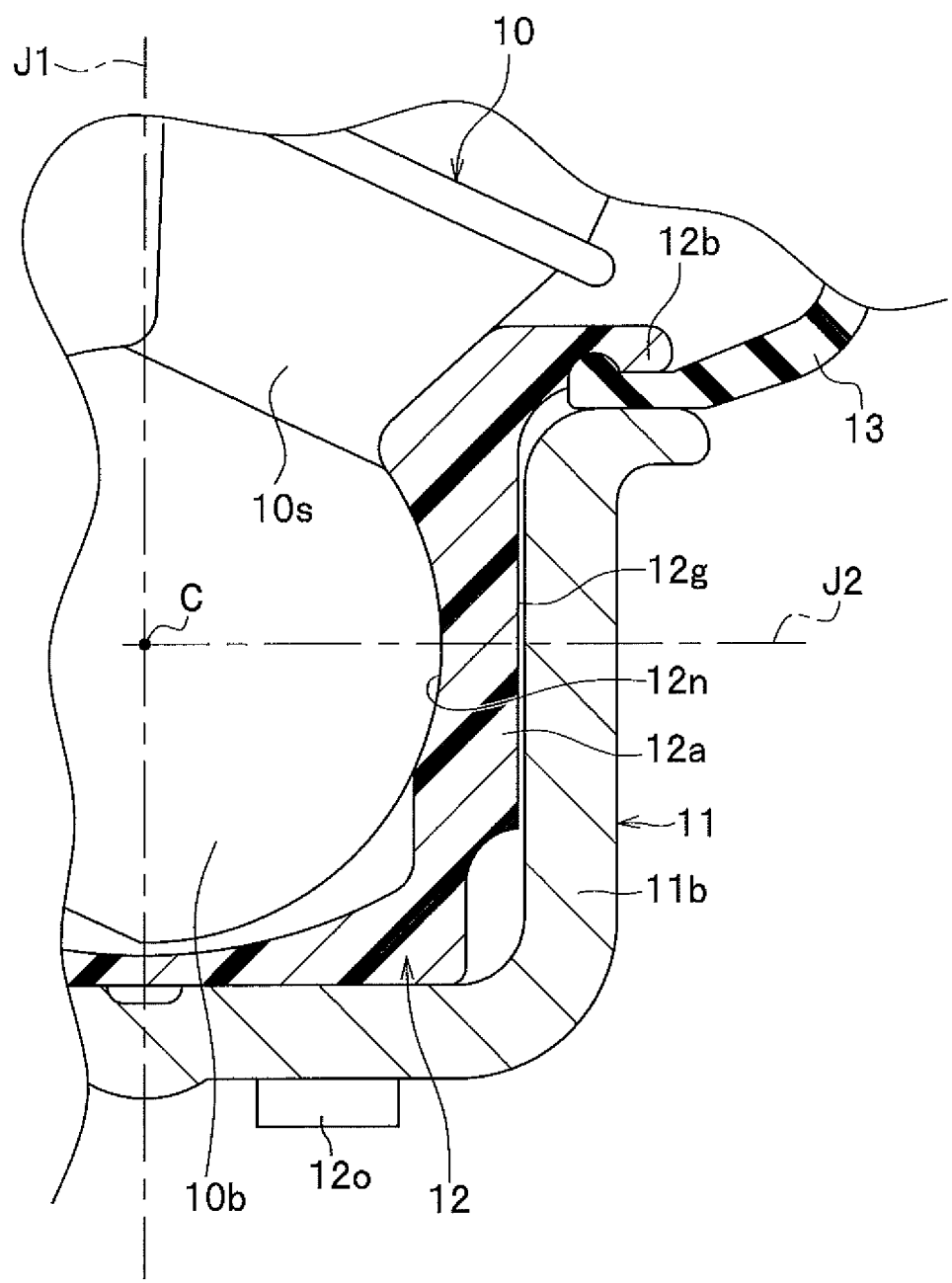
FIG. 11 is a cross-sectional view of the connecting part of the stabilizer link with the ball stud swinging to show the internal structure thereof.

FIG. 10 is a cross-sectional view of the connecting part of the stabilizer link with the ball stud in an equilibrium state (setup state) to show the internal structure thereof. FIG. 11 is a cross-sectional view of the connecting part of the stabilizer link with the ball stud swinging to show the internal structure thereof. In FIGS. 10 and 11, cross sections of the housing 11, the ball seat 12, and the dust boot 13 are shown.

With the ball stud 10 set in the connecting part 1b of the stabilizer link 1, as shown in FIG. 11, the ball stud 10 is upright with respect to the ball seat 12 in the connecting part 1b of the stabilizer link 1.

As shown in FIG. 10, the ball part 10b of the ball stud 10 receives a surface pressure as indicated by arrows from the contacting inner surface 12n of the ball seat 12. The frictional force between the ball part 10b of the ball stud 10 and the contacting inner surface 12n of the ball seat 12 due to sliding action is the frictional force when the ball stud 10 swings and rotates as shown in FIG. 11, with respect to the stabilizer link 1. Therefore, this frictional force is the swinging and rotating torque when the ball stud 10 swings and rotates. In other words, the sliding torque caused by the frictional force results in the swinging and rotating torque.

Figure 12:
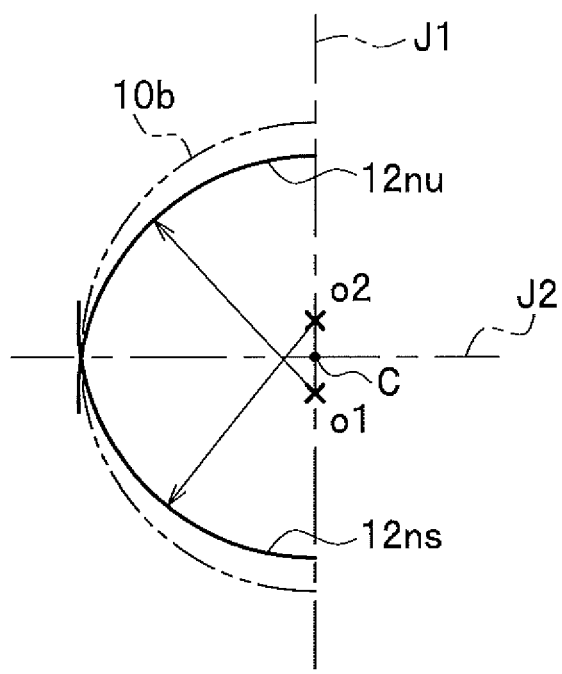
FIG. 12 is a conceptual diagram showing the center offset of the inner surface of the ball seat.

FIG. 12 is a conceptual diagram showing the center offset of the inner surface of the ball seat. In the inner surface of the ball seat 12, the upper inner surface 12nu closer to the opening has the central point O1 on the lower side, while the lower inner surface 12ns closer to the opposite side of the opening has the central point O2 on the upper side. As a result, the inner surface 12n of the ball seat 12 is formed to have a higher surface pressure at an end portion (a portion of the ball seat 12 closer to the opening or the opposite side of the opening) than at the equator (a portion of the ball seat 12 having the maximum radius about the axis J1 which runs through the centers of the opening 12i (see FIG. 10) and the grease chamber 12c (see FIG. 10) on its opposite side). In other words, the center offset in FIG. 12 allows the upper and lower end portions of the ball seat 12 to have the maximum surface pressure distributed thereat.

The surface pressure to the ball part 10b caused by the interference above the equator generates a reaction force on the lower part of the ball seat 12 due to balancing of the static force, so that the ball seat 12 has surface pressure distribution of having the maximum surface pressure at the two circles, top and bottom, i.e., the edge 12n1 at the opening 12i (see FIG. 9) and the edge 12n2 to the grease chamber (see FIG. 9), to determine the ball position.

Figure 13:
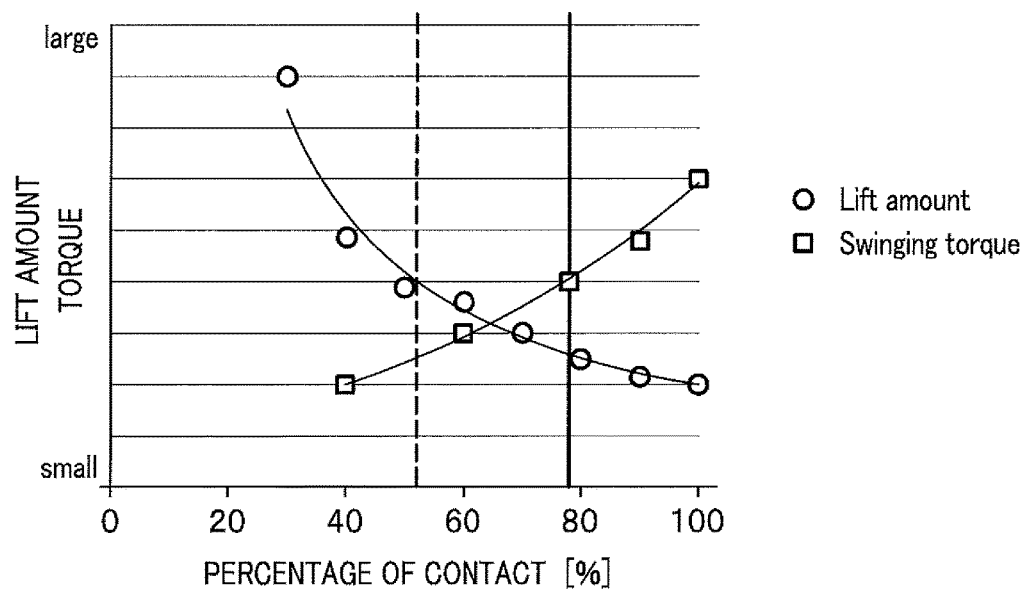
FIG. 13 is a chart showing the correlation between the percentage of contact between the ball part of the ball stud and the inner surface of the ball seat, and the swinging torque and elastic lift (loosening) when the ball stud swings.

FIG. 13 is a chart showing the correlation between the percentage of contact between the ball part of the ball stud and the inner surface of the ball seat, and the swinging torque and elastic lift when the ball stud swings. In FIG. 13, the horizontal axis indicates the percentage of contact between the ball part 10b of the ball stud 10 and the inner surface 12n of the ball seat 12, and the vertical axis indicates the magnitudes of the swinging torque and elastic lift. Note that the percentage of 100% on the horizontal axis means that there is no gap (inclusive of the grease groove 12r) in the zone where the inner surface 12n of the ball seat 12 contacts the ball part 10b, as shown in FIG. 10.

As shown in FIG. 13, as the ratio (percentage) of the contact between the ball part 10b of the ball stud 10 and the inner surface 12n of the ball seat 12 increases, the swing torque increases while the elastic lift decreases in the ball stud 10. On the contrary, as the contact ratio decreases, the swinging torque decreases while the elastic lift increases in the ball stud 10.

Then, limiting the percentage in a range between the solid line and the broken line allows both the swing torque and elastic lift of the ball stud 10 to have preferable small values.

Figure 14:
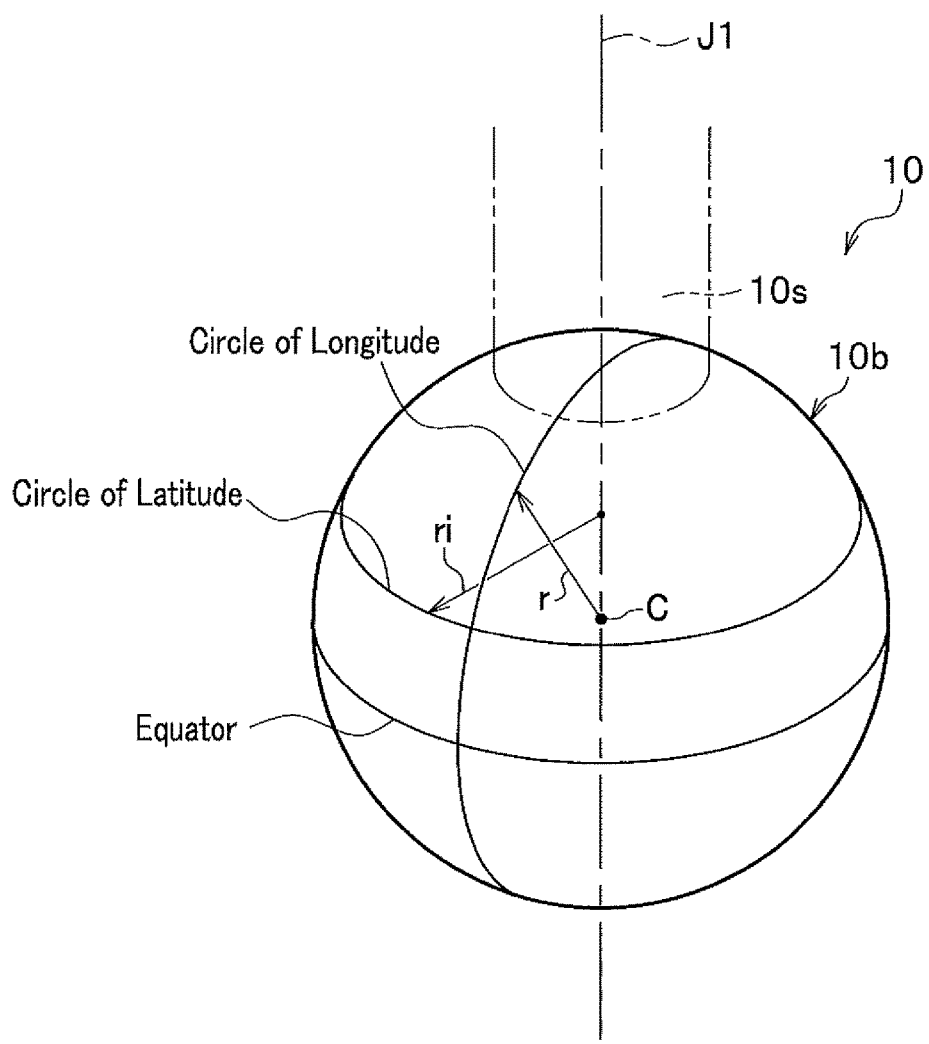
FIG. 14 is a schematic diagram showing the equator, circle of longitude, and circle of latitude of the ball part of the ball stud.

FIG. 14 is a schematic diagram showing the equator, circle of longitude, and circle of latitude of the ball part of the ball stud. The equator of the ball part 10b of the ball stud 10 means a circumferential portion thereof connecting spots having the longest radius about the vertical axis direction of the stud part 10s of the spherical ball part 10b.

The circle of longitude of the ball part 10b is a circumferential line perpendicular to the equator of the ball part 10b and corresponds to the circle of longitude set for the earth. The circle of latitude of the ball part 10b is a circumferential line parallel to the equator of the ball part 10b and corresponds to the circle of latitude set for the earth.

Figure 15:
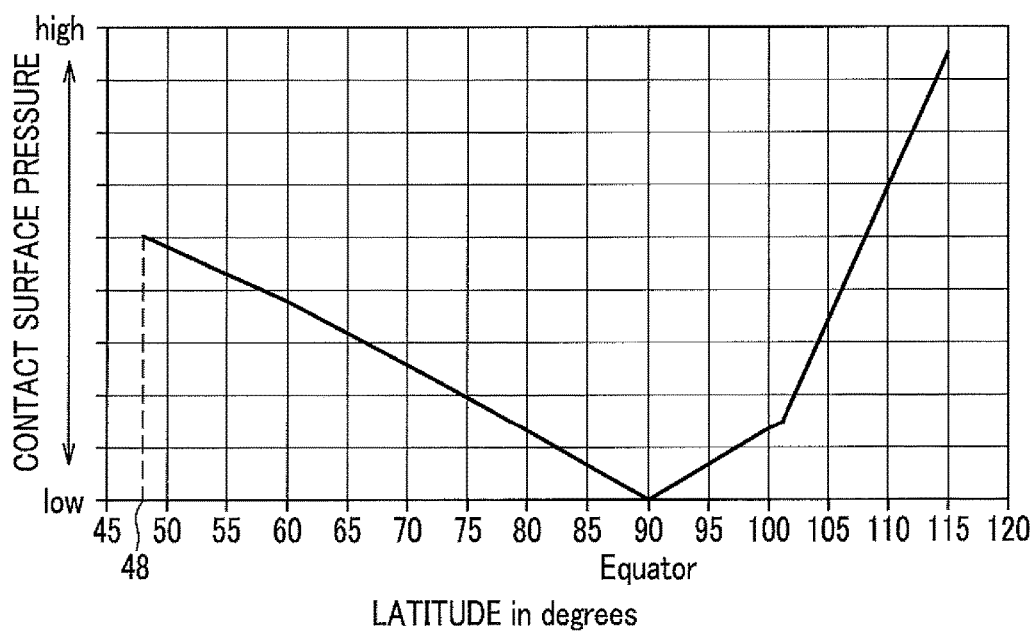
FIG. 15 is a chart showing the contact surface pressure per unit longitude by the angle from the equator, when the ball seat gaplessly contacts the ball part of the ball stud in FIG. 11.

FIG. 15 is a chart showing the contact surface pressure per unit longitude by the angle from the equator, when the ball seat gaplessly contacts the ball part of the ball stud shown in FIG. 11. The horizontal axis in FIG. 15 indicates the latitude having 90 degrees at the equator, and decreasing with the increasing distance from the equator toward 0 degree at the center of the opening 12i, to have 48 degrees at the contacting point with the upper end of the ball seat 12. On the other side, the angle increases with the increasing distance from the center of the opening 12i to have 115 degrees at the contacting point with the lower end of the ball seat 12. The vertical axis in FIG. 15 indicates the level of the surface pressure.

The contact surface pressure per unit longitude was substantially "0" at the equator. The surface pressure increased substantially in a linear manner with the increasing distance from the equator toward the stud part 10s, while it increased similarly with the increasing distance from the stud part 10s in a range from the equator to 100 degrees and some, and then increased sharply after the latitude exceeding 100 degrees and some.

Figure 16:
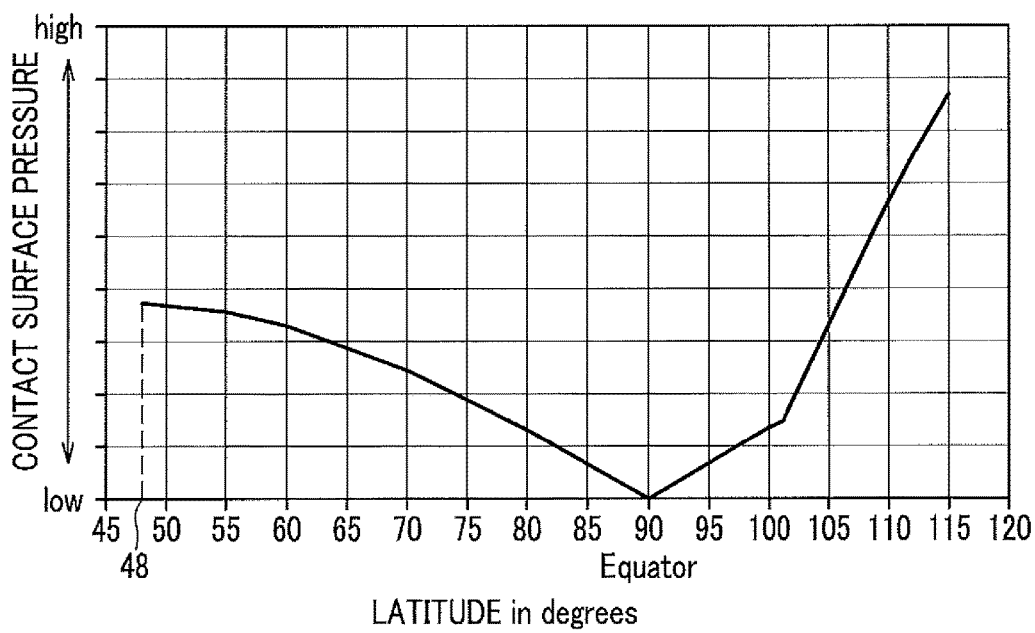
FIG. 16 is a chart showing the contact surface pressure per unit latitude by the angle from the equator, when the ball seat gaplessly contacts the ball part of the ball stud in FIG. 11, by integrating (adding) the pressure for each latitude.

FIG. 16 is a chart showing the contact surface pressure per unit latitude by the angle from the equator, when the ball seat gaplessly contacts the ball part of the ball stud in FIG. 10, by integrating (adding) the pressure for each latitude. The horizontal axis in FIG. 16 indicates the latitude having 90 degrees at the equator, and decreasing with the increasing distance from the equator toward 0 degree at the center of the opening 12i, to have 48 degrees at the contacting point with the upper end (edge 12n1 in FIG. 9) of the ball seat 12. On the other side, the angle increases with the increasing distance from the center of the opening 12i to have 115 degrees at the contacting point with the lower end (edge 12n2 in FIG. 9) of the ball seat 12. The vertical axis in FIG. 16 indicates the level of the surface pressure.

The integrated value of the surface pressure per unit latitude was substantially "0" at the latitude of the equator. The value increased substantially in a quadratic curve with the increasing distance from the equator toward the stud part 10s, while it increased similarly with the increasing distance from the stud part 10s in a range from the equator to 100 degrees and some, and then increased sharply after the latitude exceeding 100 degrees and some.

Here, the following equation holds true for a frictional force generated on the outer surface of the ball part 10b;

$$\text{Frictional force} = \text{Surface pressure} \times \text{Friction coefficient} \quad (1).$$

In addition, there are following proportional correlations between the rotating and swinging torque of the ball stud 10 and the frictional force generated on the outer surface of the ball stud 10b;

$$\text{Rotating torque} \propto \text{Frictional force about axis } J1 \quad (2) \text{ and}$$

$$\text{Swinging torque} \propto \text{Frictional force toward direction of axis } J1 \text{ tilting} \quad (3).$$

Figure 17:
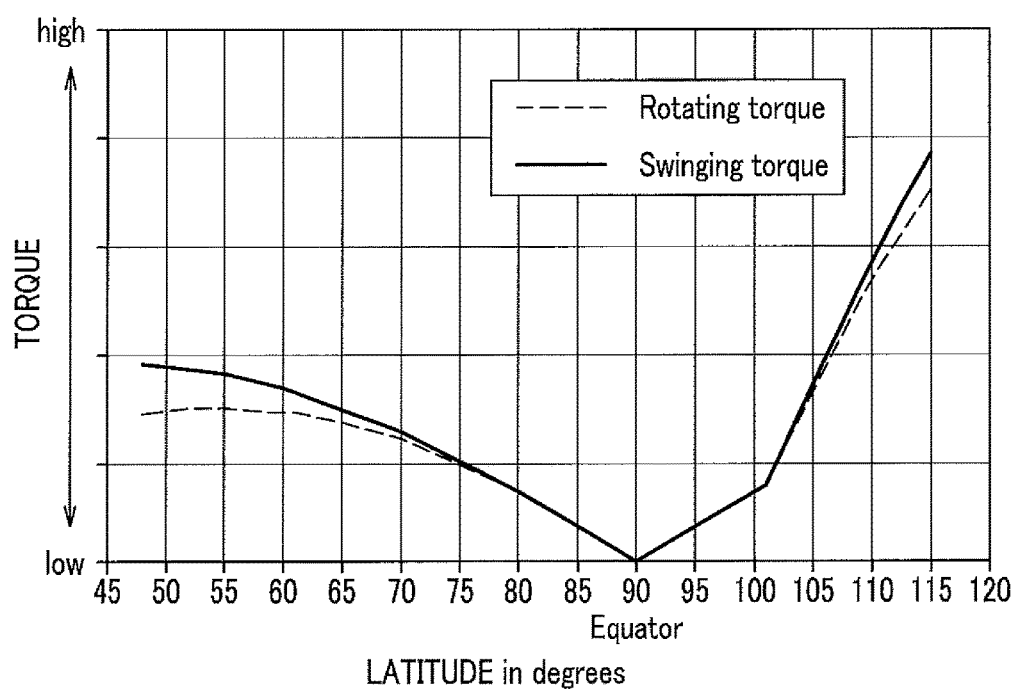
FIG. 17 is a chart qualitatively showing the rotating and swinging torque of the ball part of the ball stud in FIG. 14 at each latitude.

FIG. 17 is a chart qualitatively showing the rotating and swinging torque of the ball part of the ball stud shown in FIG. 14 at each latitude. In FIG. 17, the horizontal axis indicates the latitude of the ball part 10b of the ball stud 10 in FIG. 14, and the vertical axis indicates the level of the torque. The swinging torque at a time of the stud part 10s of the ball stud 10 swinging is expressed by the product of the surface pressure and the radius "r" (see FIG. 14) of the ball part 10b. The rotating torque at a time of the ball stud 10 rotating about the axis J1 (see FIG. 14) of the stud part 10s is expressed by a value obtained by integrating the product of the surface pressure and the radius "ri" (see FIG. 14) from the axis J1 of the stud part 10s to each circle of latitude.

As shown in FIG. 17, the swinging torque (solid line) is substantially "0" at the equator or the latitude of 90 degrees. On one side, the swinging torque increases with the increasing distance from the equator at the latitude of 90 degrees toward the stud part 10s of the ball stud 10. On the other side, the swinging torque increases similarly with the increasing distance from the stud part 10s in a range from the latitude of 90 degrees at the equator to substantially 102 degrees, and then increases sharply after the latitude exceeding substantially 102 degrees.

Likewise, the rotating torque (broken line) is substantially "0" at the equator or the latitude of 90 degrees. On one side, the rotating torque increases with the increasing distance from the equator at the latitude of 90 degrees toward the stud part 10s of the ball stud 10. On the other side, the rotating torque increases similarly with the increasing distance from the stud part 10s in a range from the latitude of 90 degrees at the equator to substantially 102 degrees, and then increases sharply after the latitude exceeding substantially 102 degrees.

From the result in FIG. 17, both the swinging torque and the rotating torque increase with the increasing distance from the equator or the latitude of 90 degrees, and therefore hollowing the ball seat 12 at a position away from the equator or the latitude of 90 degrees, making a gap between the ball seat 12 and the ball part 10b of the ball stud 10, allows the torque of the ball stud 10 to be effectively reduced.

Structure of Ball Seat 12 According to the Present Embodiment

Figure 18A:
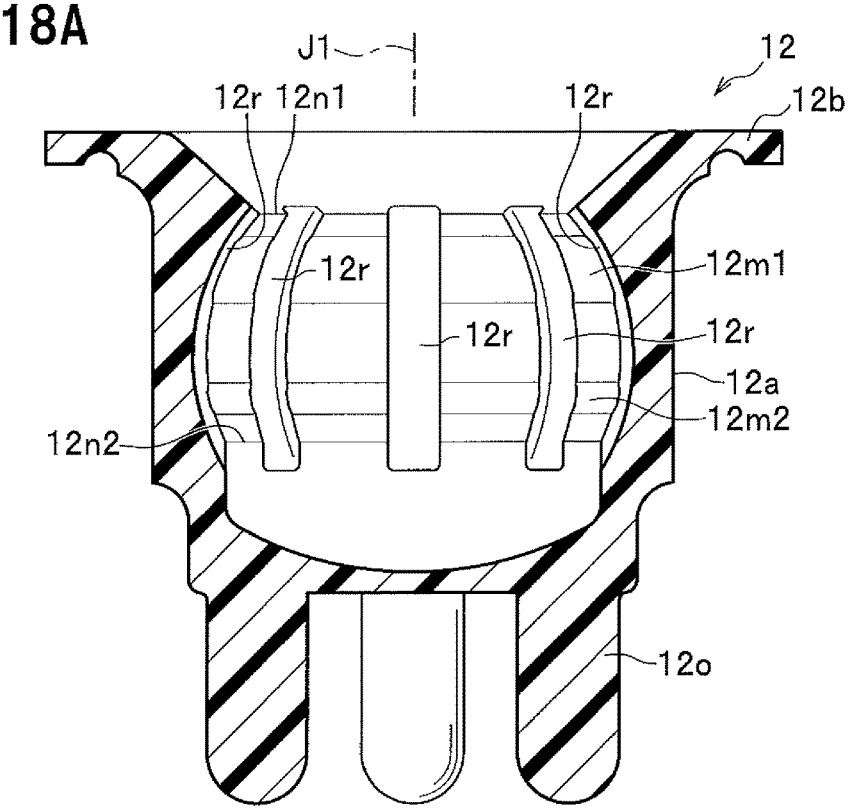
FIG. 18A is a longitudinal sectional view of the ball seat of the present embodiment to show the internal structure thereof.
Figure 18B:
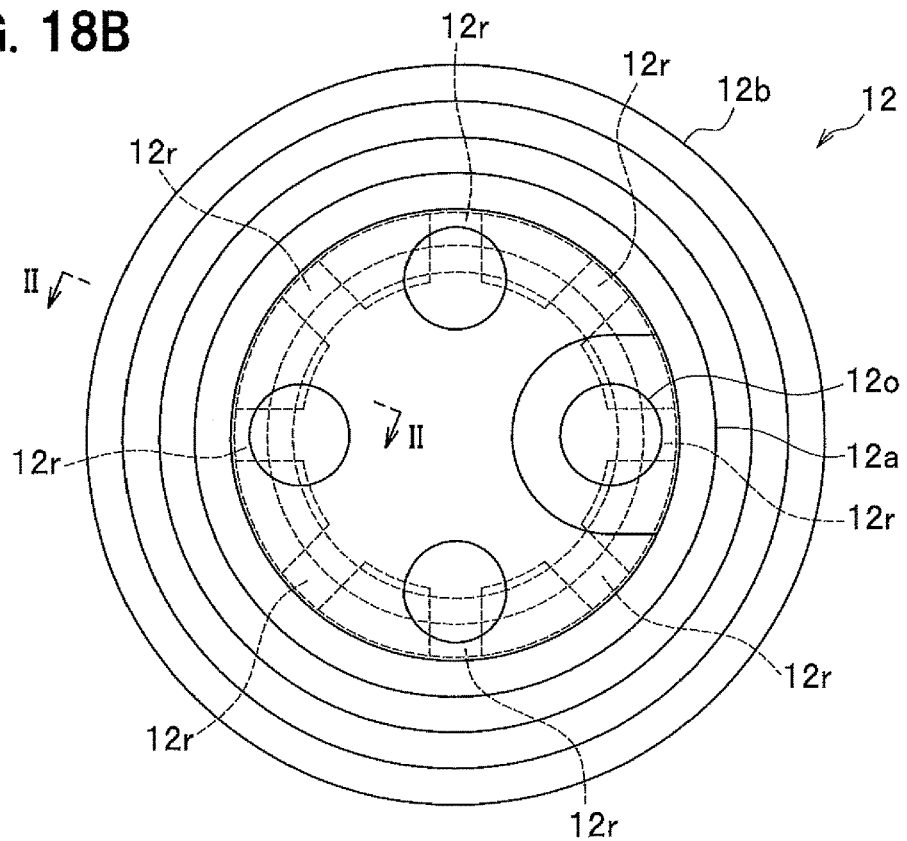
FIG. 18B is a bottom view of the ball seat.
Figure 19:
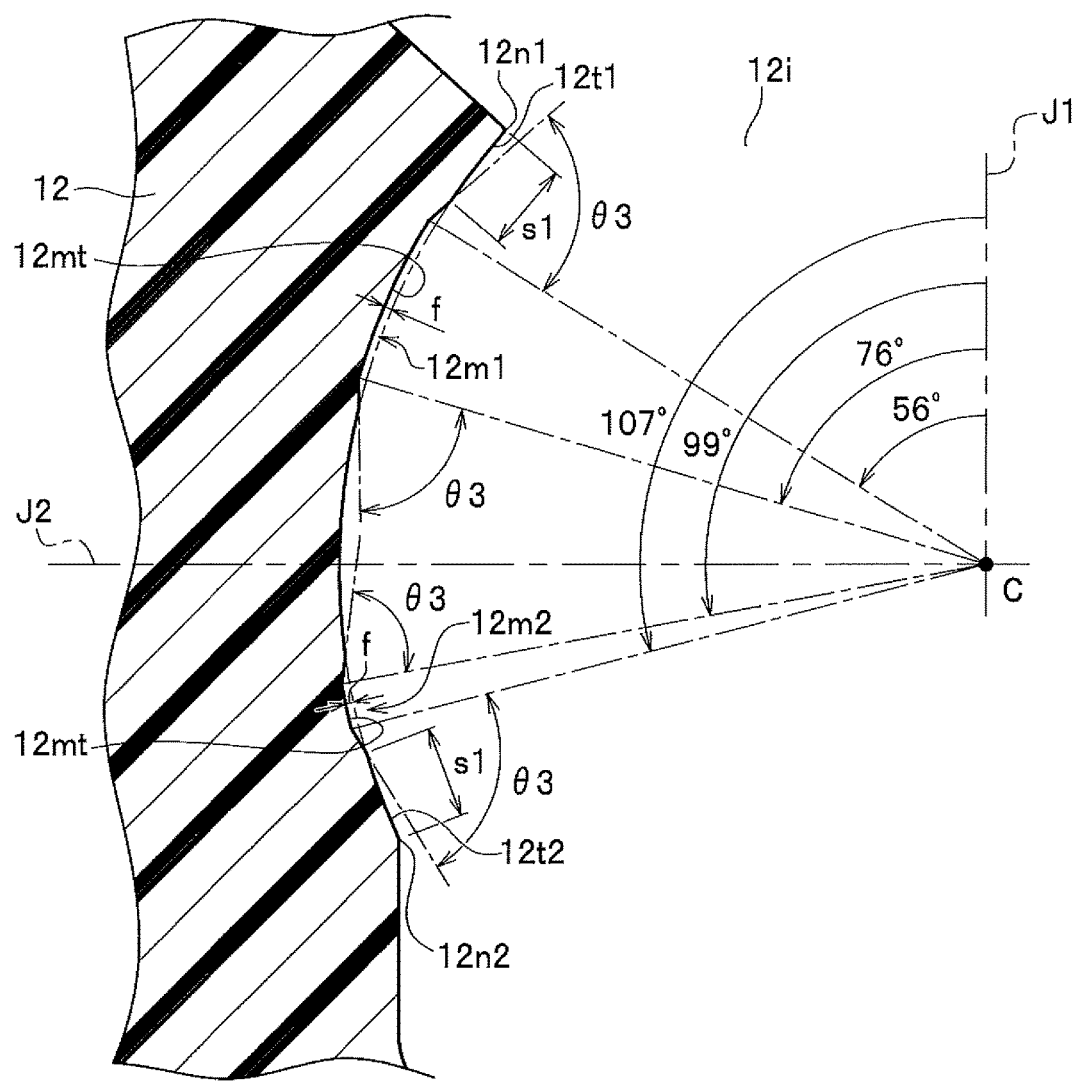
FIG. 19 is a cross-sectional view taken along a line II-II in FIG. 18B to show grooved parts of the ball seat.

FIGS. 18A and 18B are diagrams showing the structure of the ball seat 12 according to the present embodiment. FIG. 18A is a longitudinal sectional view of the ball seat of the present embodiment to show the internal structure thereof, and FIG. 18B is a bottom view of the ball seat according to the present embodiment. FIG. 19 is a cross-sectional view taken along line II-II in FIG. 18B to show grooved parts of the ball seat.

From the above-identified result, the ball seat 12 is hollowed in the present embodiment at two portions apart from the equator or the latitude of 90 degrees, to form grooved parts 12m1, 12m2 for making a gap at the portions, where the ball seat 12 contacts the ball part 10b of the ball stud 10, so as to reduce the torque of the ball stud 10. The grooved parts 12m1, 12m2 in a recessed shape are formed so as to have the central points offset from the central point C of the ball part 10b of the ball stud 10.

The ball seat 12 is formed by injection molding. The grooved parts 12m1, 12m2 are formed during the injection molding.

That is, the bottom part 12mt of the grooved parts 12m1, 12m2 has substantially the same curvature as the ball part 10b of the ball stud 10 so as to have the centers of curvature offset from the central point of the ball part 10b. Therefore, even if the inner surface 12n of the ball seat 12 is deformed, the grooved parts 12m1, 12m2 allows the ball seat 12 to maintain a gap between the ball seat 12 and the ball part 10b of the ball stud 10.

Note that the grooved parts 12m1, 12m2 may have a cross section other than a rectangular shape or the like, as long as a gap is maintained when the ball seat 12 is deformed.

In addition, a zone of the inner surface 12n forming the spherical space 12k on which the ball part 10b slides, exclusive of the grooved parts 12m1, 12m2, may preferably occupy 38.5% or more of a zone of the inner surface 12n defined by top and bottom circles of latitude in correspondence with a central angle of 63 to 75 degrees. This allows for supporting the ball part 10b of the ball stud 10. Note that the zone for sliding is restricted from the determined torque value and the elastic lift.

As shown in FIG. 18A, the ball seat 12 includes the main body 12a in a cup shape and the flange part 12b formed around the opening of the main body 12a. The main body 12a has the three bosses 12o at the bottom, extending downward, so as to be fixed into the housing 11 by hot pressure welding. As shown in FIG. 18B, the main body 12a has eight grease grooves 12r formed on the inner surface 12n thereof, in which grease is retained, in the direction of the axis J1 of the ball seat 12. For example, the grease groove 12r has the width of about 2 mm.

In addition, the main body 12a has the grooved parts 12m1, 12m2 arranged in the upper and lower portions of the inner surface 12n thereof across the equator, which are circumferentially recessed for reducing the torque of the ball stud 10. The grooved parts 12m1, 12m2 are circumferentially arranged about the axis J1 of the ball seat 12. Note that the grooved parts 12m1, 12m2 may be discontinuously provided.

The ball part 10b of the ball stud 10 fitted into the ball seat 12 is supported by surface pressure Po of the ball seat 12. If there is no grooved part 12m1 or 12m2 in the ball seat 12, per-longitude distributed surface pressure Poi is as shown in FIG. 15. If the ball seat 12 has no grooved part 12m, per-latitude distributed surface pressure Pai of the ball part 10b of the ball stud 10 is expressed with the following formula:

$$Pai = Poi \times 2\pi \times ri \qquad (4).$$

The per-latitude distributed surface pressure Pai is shown in FIG. 16 in a case where the ball seat 12 has no grooved parts 12m1 or 12m2. From FIG. 16, distributed rotating torque Tri is expressed by multiplying the distributed surface pressure Pai by the radius "ri" for each latitude (see FIG. 14):

$$Tri = Pai \times ri \qquad (5).$$

In addition, distributed swinging torque Toi is expressed by multiplying the distributed surface pressure Pai by the radius "r" of the ball part 10b:

$$Toi = Pai \times r \qquad (6).$$

The distributed rotating torque Tri and distributed swinging torque Toi are shown in FIG. 17. The rotating torque Tr for rotating the ball stud 10 is expressed as:

$$Tr = \Sigma Tri \qquad (7),$$

and the swinging torque To for swinging the ball stud 10 is expressed as:

$$To = \Sigma Toi \qquad (8).$$

As shown in FIGS. 18A and 18B, the ball seat 12 has eight grease grooves 12r having a width of 2 mm formed in the inner surface 12n thereof. From the viewpoint of being formed by injection molding and supporting the ball part 10b of the ball stud 10 by the contact surface pressure at the upper and lower end lines, the ball seat 12 has end surfaces 12t1, 12t2 reserved at the upper and lower ends, each of which has a width s1 (see FIG. 19) of about 1 mm. The width s1 of the upper and lower end surfaces of the ball seat 12 is preferably 0.5 mm or more.

Then, the two grooved parts 12m1, 12m2 are circumferentially formed in the vicinity of the end surfaces 12t1, 12t2 where the torque is most effectively reduced.

Figure 20:
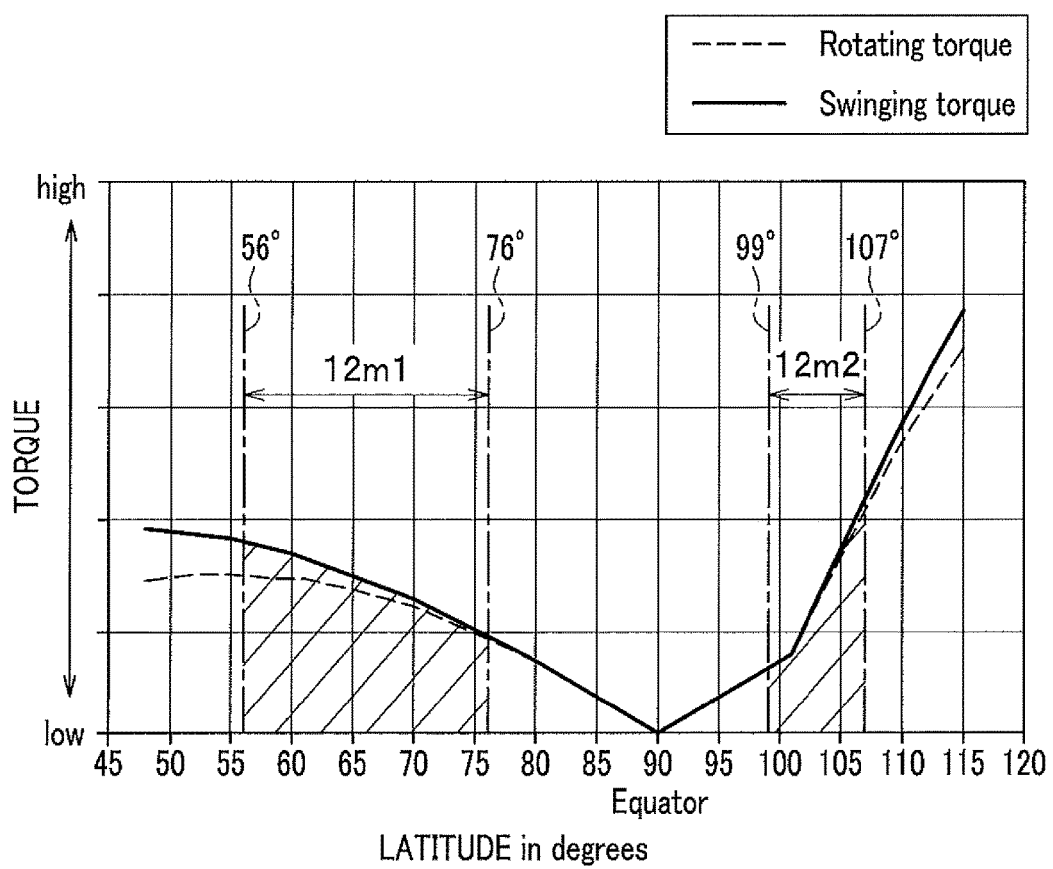
FIG. 20 is a chart indicating locations of the grooved parts of the present embodiment with respect to the rotating and swinging torque of the ball part of the ball stud at each latitude in FIG. 18A.

FIG. 20 is a chart indicating locations of the grooved parts of the present embodiment with respect to the rotating and swinging torque of the ball part of the ball stud at each latitude in FIGS. 18A and 18B. For example, assuming that the latitude is 0 degree on the axis J1 extending toward the opening 12i, the grooved part 12m1 occupies a zone ranging from 56 to 76 degrees and the grooved part 12m2 occupies a zone ranging from 99 to 107 degrees. Note that the grooved parts 12m1, 12m2 are represented by the bottoms thereof to indicate these zones.

The grooved parts 12m1, 12m2 are arranged to have a depth "f" of 0.1 to 0.2 mm or so, considering the inner pressure while the ball part 10b of the ball stud 10 is inserted onto the ball seat 12 at the time of assembly, and the tensile load due to detaching a male mold as well as detachability of a male mold at the time of molding. Note that the grooved parts 12m1, 12m2 may have a depth "f" of 0.08 to 0.25 mm, most preferably a depth of 0.1 to 0.2 mm or so.

As shown in FIG. 19, the upper and lower ends of the grooved parts 12m1, 12m2 continue to the bottoms thereof via tapered (or inclined) surfaces at an angle θ3 of at least 50 degrees or more to a normal line to the spherical inner surface 12n of the ball seat 12, considering detachability of a male mold at the time of molding and contact continuity from the spherical part (inner surface 12n) to the grooved parts 12m1, 12m2.

The ball seat 12 includes a tapered (or inclined) surface continuing from the inner surface 12n to the grooved part 12m1 or 12m2 at an angle θ3 of about 50 degrees or more with respect to a normal line to the tangent of the ball part 10b. As the ball seat 12 is formed by injection molding, this tapered (or inclined) surface is arranged for removing the mold from the opening of the ball seat 12, so that the angle θ3 is preferably 50 degrees or more.

In the present embodiment, the sizes and positions of the grooved parts 12m1, 12m2 are adjusted to set the swinging torque of the ball stud 10 with respect to the stabilizer link 1 to 0.5 Nm or less and to set the rotating torque to 0.5 Nm or less.

Hollowing the ball seat 12 of the present embodiment in zones effective for the rotating and swinging torque allows the swinging and rotating torque of the ball stud to be adjusted so as to have desired values.

<Structure of Ball Seat 12 According to Modification>

Figure 21A:
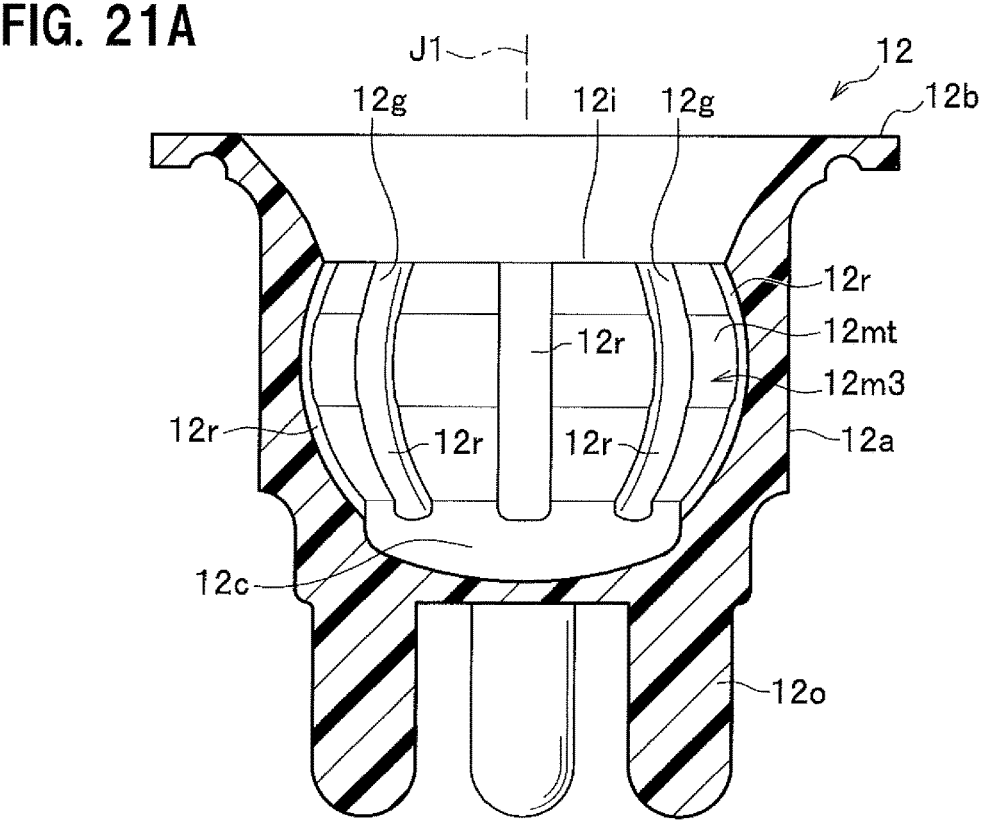
FIG. 21A is a longitudinal sectional view of a ball seat of a modification to show the internal structure thereof.
Figure 21B:
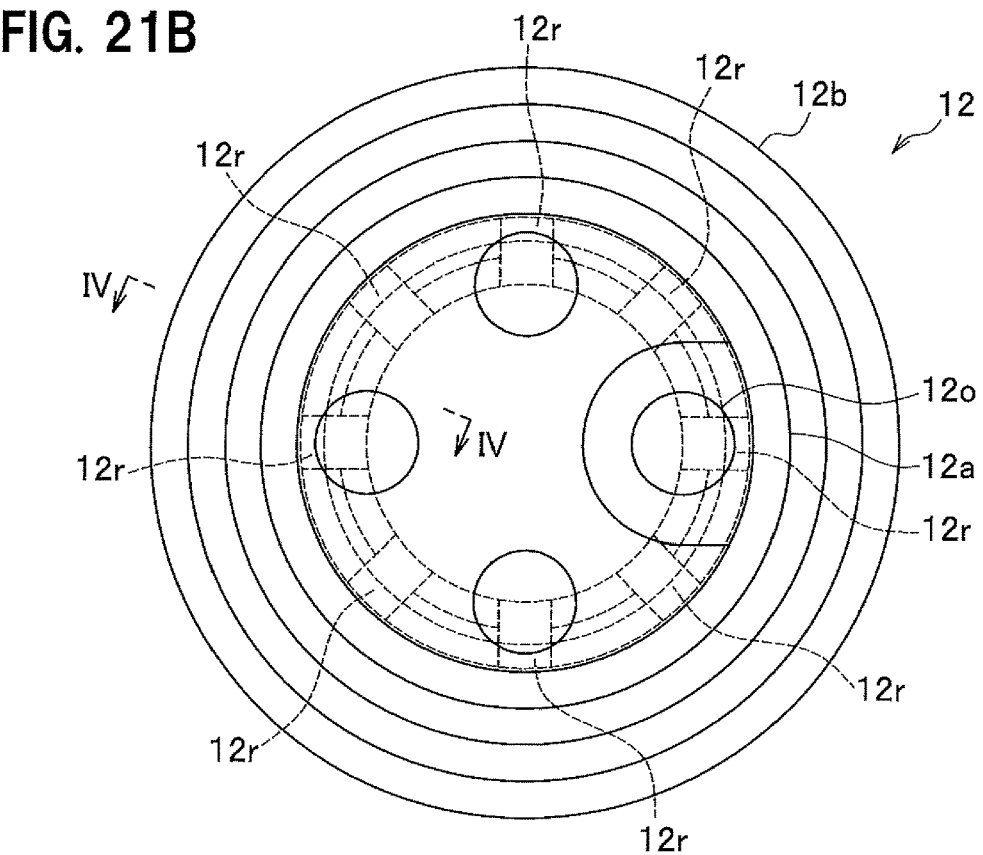
FIG. 21B is a bottom view of the ball seat.
Figure 22:
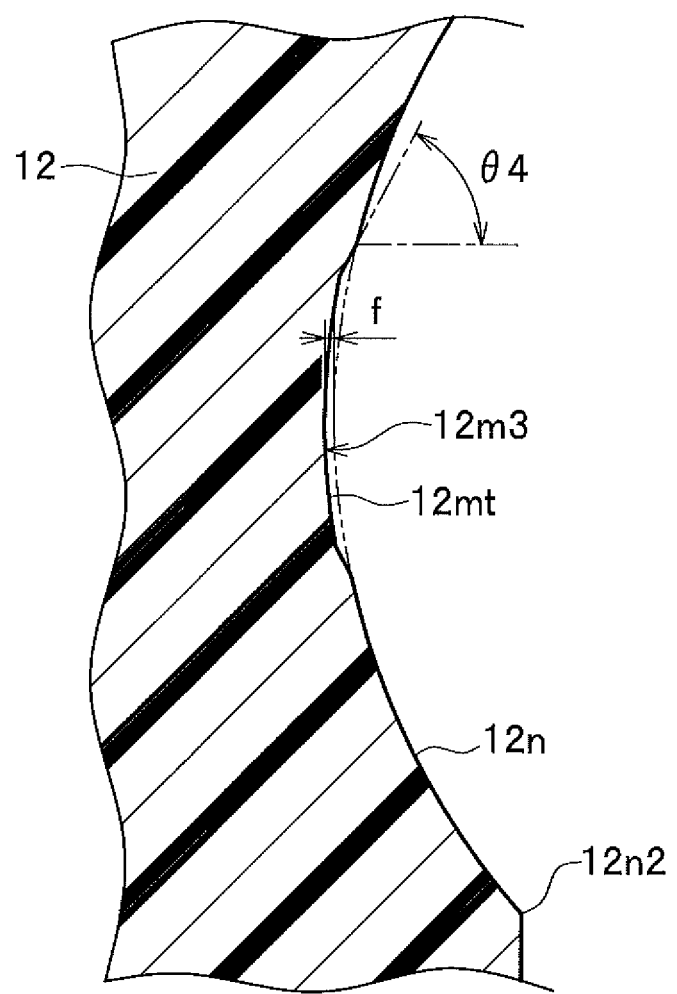
FIG. 22 is a cross-sectional view taken along a line IV-IV in FIG. 21B to show a grooved part of the ball seat.
Figure 23:
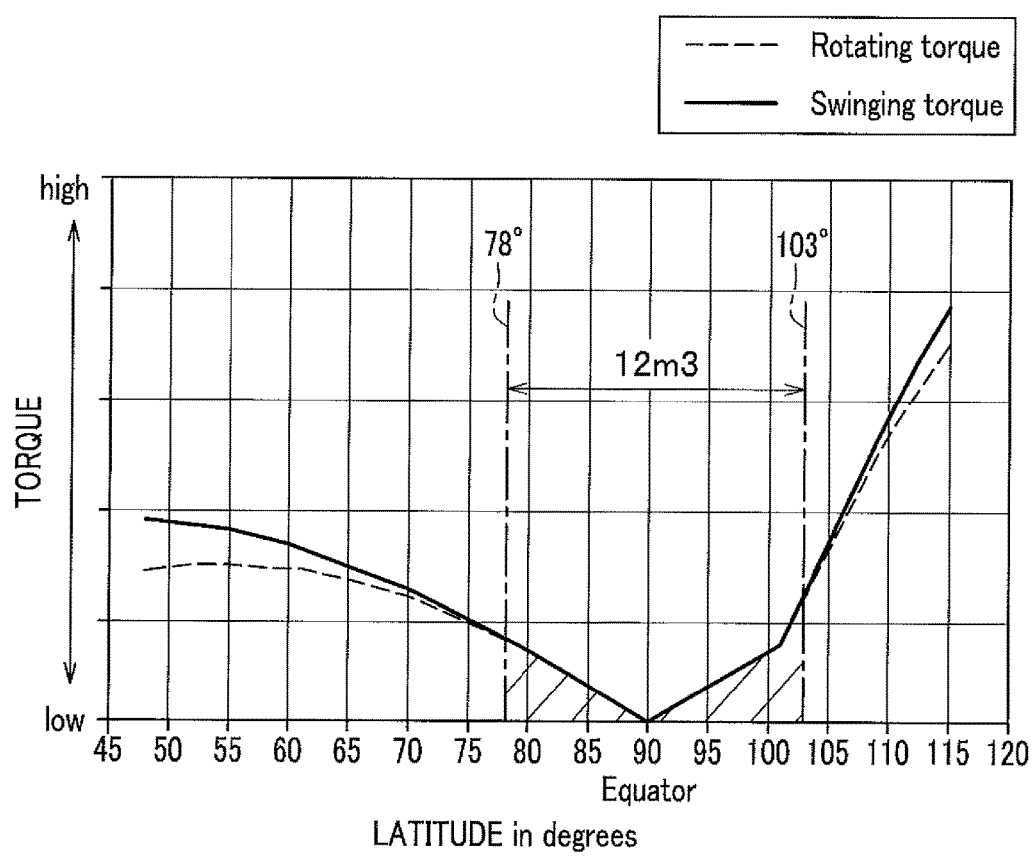
FIG. 23 is a chart indicating a location of the grooved part of the modification with respect to the rotating torque and swinging torque of the ball part of the ball stud at each latitude in FIGS. 21A and 21B.

The ball seat 12 according to a modification is a connection part of the stabilizer link 1 having a gap in the vicinity of the equator of the ball part 10b of the ball stud 10, as shown in FIGS. 21A and 21B. FIGS. 21A and 21B show the structure of the ball seat 12 of the modification. FIG. 21A is a longitudinal sectional view of a ball seat of the modification to show the internal structure thereof, and FIG. 21B is a bottom view of the ball seat. FIG. 22 is a cross-sectional view taken along a line IV-IV in FIG. 21B to show a grooved part of the ball seat. FIG. 23 is a chart indicating a location of the grooved part of the modification with respect to the rotating and swinging torque of the ball part of the ball stud at each latitude in FIGS. 21A and 21B.

The ball seat 12 of the modification has a grooved part 12m3 formed circumferentially near the equator (a portion of the ball seat 12 having the maximum radius about the axis J1 which runs through the centers of the opening 12i and the grease chamber 12c) of the inner surface 12n of the spherical part of the ball seat 12. More specifically, assuming that the latitude is 0 degree on the axis J1 extending toward the opening 12i, the grooved part 12m3 occupies a zone ranging from 78 to 103 degrees (see FIG. 23). The grooved part 12m3 is formed in the same manner as the grooved parts 12m1, 12m2 of the present embodiment. That is, the ball seat 12 is formed by injection molding. The grooved part 12m3 is formed at the time of injection molding.

In addition, a zone of the inner surface 12n forming the spherical space 12k on which the ball part 10b slides, exclusive of the grooved part 12m3, may preferably occupy 38.5% or more of a zone of the inner surface 12n defined by top and bottom circles of latitude in correspondence with a central angle of 63 to 75 degrees. Note that the zone for sliding is restricted from the determined torque value and the elastic lift.

The grooved part 12m3 is arranged to have a depth "f" of 0.1 to 0.2 mm or so, considering the inner pressure while the ball part 10b of the ball stud 10 is inserted onto the ball seat 12 at the time of assembly, and the tensile load due to detaching a male mold as well as detachability of a male mold at the time of molding. Note that the grooved part 12m3 may have a depth "f" of 0.08 to 0.25 mm, but the most preferable depth is 0.1 to 0.2 mm or so.

As shown in FIG. 22, the upper and lower ends of the grooved part 12m3 continue to the bottom thereof via tapered (or inclined) surfaces at an angle θ4 of at least 50 degrees or more with respect to a normal line to the spherical inner surface 12n of the ball seat 12, considering detachability of a male mold at the time of molding and contact continuity from the spherical part (inner surface 12n) to the grooved part 12m3. As the ball seat 12 is formed by injection molding, the tapered (or inclined) surface is arranged for removing the mold from the opening of the ball seat 12, so that the angle θ4 is preferably 50 degrees or more.

In the modification, the swinging torque of the ball stud 10 with respect to the stabilizer link 1 is set to 0.5 Nm or less and the rotating torque is set to 0.5 Nm or less.

Comparison Between Comparative Examples 1 and 2, Modification, and Present Embodiment

TABLE 1

|  | Comparative Example 1 (CE1) | Comparative Example 2 (CE2) | Modification (Mod) | Present Embodiment |
|---|---|---|---|---|
| Grease Groove width & counts | 0 | 2 mm × 8 | 2 mm × 8 | 2 mm × 8 |
| Grooved part counts & Distribution | 0 | 0 | 1 (at equator) 78 to 103 deg. | 2 (up & down) 56 to 76 deg. 99 to 107 deg. |
| Contact surface area | 438.8 | 288.4 | 169.2 | 169.3 |
| Reduction ratio | (referenced) | 34.3% | 61.4% | 61.4% |
| Rorating torque | 623.3 | 383.9 | 331.1 14% LT CE2 | 214.1 44% LT CE2 35% LT Mod |
| Swinging torque | 689.1 | 423.1 | 369.6 13% LT CE2 | 238.3 44% LT CE2 35% LT Mod |

Here, "LT" is the abbreviation of "Less Than."

Table 1 summarises comparison results between Comparative Example 1 having no groove (grease groove 12r) or grooved part arranged between the ball seat 12 and the ball part 10b of the ball stud 10, Comparative Example 2 having the grease grooves 12r arranged therebetween, Modification having the grease grooves and a grooved part arranged therebetween (see FIGS. 21A and 21B), and the present embodiment having the grease grooves and two grooved parts arranged therebetween (see FIG. 18A), wherein the single grooved part is arranged near the equator and the two grooved parts are arranged above and below the equator to reduce area of contact between the ball seat 12 and the ball part 10b.

Comparative Example 1 has no grease groove 12r arranged axially or no grooved parts 12m1, 12m2, 12m3 arranged circumferentially as being arranged in the present embodiment. Comparative Example 1 has area of contact of 438.8 mm2 between the ball part 10b of the ball stud 10 and the ball seat 12. Comparative Example 1 has the rotating torque of 623.3 Nmm (=10−3×Nm (Newton meter)) about the axis of the ball stud 10, and the swinging torque of 689.1 Nmm with which the ball stud 10 swings.

Comparative Example 2 has eight grease grooves 12r having a width of 2 mm arranged, but has no grooved parts 12m1, 12m2, 12m3 arranged circumferentially as in the present embodiment. Comparative Example 2 has area of contact of 288.4 mm2 between the ball part 10b of the ball stud 10 and the ball seat 12. The area of contact of 288.4 mm2 in Comparative Example 2 is reduced by 34.3% as compared to that of 438.8 mm2 in Comparative Example 1. Comparative Example 2 has the rotating torque of 383.9 Nmm about the axis of the ball stud 10, and the swinging torque of 423.1 Nmm with which the ball stud 10 swings.

Modification has eight grease grooves 12r having a width of 2 mm arranged, and has an equatorial groove (grooved part 12m3) arranged near the equator of the ball seat 12 (circle of latitude having the largest radius about the axis J1 which runs through the centers of the opening 12i of the ball seat 12 and the grease chamber 12c). Assuming that the latitude is 0 degree on the axis J1 extending toward the opening 12i and the latitude is 180 degrees on the axis J1 extending toward the grease chamber 12c, Modification has the equatorial groove formed in a zone of the latitude of 78 to 103 degrees (see FIG. 23). The area of contact of 169.2 mm2 in Modification is reduced by 61.4% as compared to that of 288.4 mm2 in Comparative Example 2.

Modification has the rotating torque of 331.1 Nmm about the axis of the ball stud 10, and this has been reduced by 14% as compared to that of 383.9 Nmm in Comparative Example 2. Modification has the swinging torque 369.6 Nmm with which the ball stud 10 swings, and this has been reduced by 13% as compared to that of 423.1 Nmm in Comparative Example 2.

The present embodiment has eight grease grooves 12r having a width of 2 mm arranged, and has two grooved parts 12m1, 12m2 arranged above and below the equator of the ball seat 12 (circle of latitude having the largest radius about the axis J1 which runs through the centers of the opening 12i of the ball seat 12 and the grease chamber 12c). Assuming that the latitude is 0 degree on the axis J1 extending toward the opening 12i and the latitude is 180 degrees on the axis J1 extending toward the grease chamber 12c, the present embodiment has the grooved parts 12m1, 12m2 formed in two zones having the latitude of 56 to 76 degrees and the latitude of 99 to 107 degrees (see FIG. 20A), respectively.

The area of contact of 169.3 mm2 in the present embodiment is reduced by 61.4% with respect to that of 288.4 mm2 in Comparative Example 2. The present embodiment has the rotating torque of 214.1 Nmm about the axis of the ball stud 10, which has been reduced by 44% as compared to that of 383.9 Nmm in Comparative Example 2 and has been reduced by 35% as compared to that of 331.1 Nmm in Modification. The present embodiment has the swinging torque of 238.3 Nmm with which the ball stud 10 swings, which has been reduced by 44% as compared to that of 423.1 Nmm in Comparative Example 2 and has been reduced by 35% as compared to that of 369.6 Nmm in Modification.

The above configuration allows the swinging torque of the ball stud 10 swinging the stabilizer link 1 to be set to 0.5 Nm or less, and allows the rotating torque of the ball stud 10 rotating to be set to 0.5 Nm or less. Therefore, the swinging torque of the ball stud 10 swinging the stabilizer link 1 and the rotating torque of the ball stud 10 rotating the stabilizer link 1 are reduced to improve ride quality, dynamic characteristics, and durability of the vehicle using the stabilizer link 1.

In addition, the grooved parts 12m1, 12m2 and the grooved part 12m3 are adjusted as appropriate to have the desired swinging and rotating torque while supporting the ball stud 10.

Therefore, suitably adjusting the torque and the elastic lift allows for suppressing accelaration of mutual wearing of parts around the stabilizer link 1 at the time of market use. This causes stablizer links having poor dynamic characteristics to be less used in the market to allow the stabilizer link having good dynamic characteristics to prevail. In addition, this allows for suppressing abnormal noise from around the stabilizer link 1.

From the above, the stabilizer link 1 is capable of effectively suppressing loosening between the ball part 10b of the ball stud 10 and the ball seat 12, which is included in the housing 11 to receive the ball part 10b so as to be slidable, to allow the ball stud 10 to have reduced torque at the time of the ball stud 10 swinging and the rotating.

Note that the present invention is not limited to the above-described embodiment, and design may be modified as appropriate without departing from the spirit of the invention.

OTHER EMBODIMENTS

1. The grooved parts 12m1, 12m2, 12m3 as described in the present embodiment and Modification may have any cross-sectional shape such as a rectangular shape and a shape having arbitrary curvature, as long as it is in a concave shape.

2. The grooved parts 12m1, 12m2 of the present embodiment are arranged one on each side of the equator in the inner surface 12n of the ball seat 12, but two or more grooved parts may be arranged on each side.

In addition, one or more grooved parts 12m1, 12m2 of the present embodiment may be arranged only on one side of the equator in the inner surface 12n of the ball seat 12.

3. The grooved parts 12m1, 12m2 of the present embodiment and the grooved part 12m3 of Modification are described as being continuously formed, but these may be formed discontinuously (at intervals).

4. As shown in FIG. 3, the housing 11 of the present embodiment houses the ball seat 12, which defines the spherical space 12k. However, the housing 11 may form a spherical space 12l to receive the ball part 10b of the ball stud 10. That is, the ball seat 12 may not be provided. Such a configuration allows the housing 11 to have a simple structure.

5. The stabilizer link 1 (see FIG. 3) is not limited to a structure which includes the connecting parts 1b in a ball joint structure at both ends of the support bar 1a. For example, the connecting part 1b in a ball joint structure may be arranged only at one end of the support bar 1a. In this case, a connecting part in a different structure (for example, a ball bushing structure) may be arranged at the other end of the support bar 1a.

6. Individual components described in the present embodiments and Modification may be combined as appropriate to configure a new embodiment.

The invention claimed is:

1. A stabilizer link comprising:
an arm part; and
connecting parts that are arranged at both ends of the arm part, wherein one of the connecting parts is connected to a first structure and the other of the connecting parts is connected to a second structure, and at least one of the connecting parts has a ball joint structure,
wherein the connecting part having the ball joint structure includes:
a housing that supports a ball stud to be connected to the first or second structure so as to be swingable and rotatable, wherein the ball stud has a spherical part and a stud part extending from the spherical part; and
a support member that receives the spherical part in a spherical space so as to be slidable for the housing to support the ball stud, and includes:
an opening where the spherical space is open for the stud part extending therethrough;
a lubricant receiving part in a concave shape that is formed at a bottom opposed to the opening; and
a wall surface that forms the spherical space for the spherical part to slide thereon and has annular recessed grooves formed circumferentially about a central axis of the spherical space running from the opening to the lubricant receiving part, on both sides in the central axis direction of an equator portion of the wall surface disposed at a center of the spherical space having a maximum inner radius about the central axis,
wherein the wall surface has a center offset structure such that a center of an upper hemisphere of the wall surface, from the opening to the equator portion, is positioned lower on the central axis than the center of the spherical space, while a center of a lower hemisphere of the wall surface, from the equator portion to the lubricant receiving part, is positioned higher on the central axis than the center of the spherical space, to cause the wall surface to have the lowest surface pressure at the equator portion and to have a higher surface pressure with increasing distance from the equator portion toward the opening or the lubricant receiving part, and
wherein, assuming that the latitude is 0 degrees on the central axis extending toward the opening and 90 degrees at the equator portion, the recessed grooves are formed in a zone ranging from 56 to 76 degrees and a zone ranging from 99 to 107 degrees, and
a torque required for sliding the spherical part in the spherical space is 0.5 Nm or less.

2. The stabilizer link according to claim 1, wherein
a zone of the wall surface forming the spherical space, on which the spherical part slides, occupies 38.5% or more of a zone of the same defined by top and bottom circumferences of the spherical space in correspondence with a central angle of 63 to 75 degrees.

3. The stabilizer link according to claim 1, wherein
the distance between an edge of the spherical space, on which the spherical part slide, and an outmost recessed groove is 0.5 mm or more.

4. The stabilizer link according to claim 1, wherein
an end of each recessed groove continues to the wall surface in the spherical space at an angle of 50 degrees or more with respect to a normal line to the wall surface.

5. The stabilizer link according to claim 1, wherein the depth of each recessed groove is 0.08 mm to 0.25 mm.

6. The stabilizer link according to claim 1, wherein an upper end of the spherical part in a direction of the axis of the stud part is exposed on the outside of the spherical space.

7. A stabilizer link comprising:

an arm part; and connecting parts that are arranged at both ends of the arm part, wherein one of the connecting parts is connected to a first structure and the other of the connecting parts is connected to a second structure, and at least one of the connecting parts has a ball joint structure, wherein the connecting part having the ball joint structure includes:

a housing that supports a ball stud to be connected to the first or second structure so as to be swingable and rotatable, wherein the ball stud has a spherical part and a stud part extending from the spherical part; and a support member that receives the spherical part in a spherical space so as to be slidable for the housing to support the ball stud, and includes:

an opening where the spherical space is open for the stud part extending therethrough;

a lubricant receiving part in a concave shape that is formed at a bottom opposed to the opening; and a wall surface that forms the spherical space for the spherical part to slide thereon and has an annular recessed groove formed circumferentially about a central axis of the spherical space running from the opening to the lubricant receiving part, in the vicinity of an equator portion of the wall surface disposed at a center of the spherical space having a maximum inner radius about the central axis, wherein the wall surface has a center offset structure such that a center of an upper hemisphere of the wall surface, from the opening to the equator portion, is positioned lower on the central axis than the center of the spherical space, while a center of a lower hemisphere of the wall surface, from the equator portion to the lubricant receiving part, is positioned higher on the central axis than the center of the spherical space, to cause the wall surface to have the lowest surface pressure at the equator portion and to have a higher surface pressure with increasing distance from the equator portion toward the opening or the lubricant receiving part, wherein, assuming that the latitude is 0 degrees on the central axis extending toward the opening and 90 degrees at the equator portion, the recessed groove is formed in a zone ranging from 78 to 103 degrees, and a torque required for sliding the spherical part in the spherical space is 0.5 Nm or less.

* * * * *